US00RE49246E

(19) United States
(12) Reissued Patent
Dias et al.

(10) Patent Number: US RE49,246 E
(45) Date of Reissued Patent: *Oct. 11, 2022

(54) LED ILLUMINATION DEVICE AND METHOD FOR ACCURATELY CONTROLLING THE INTENSITY AND COLOR POINT OF THE ILLUMINATION DEVICE OVER TIME

(71) Applicant: Lutron Technology Company LLC, Coopersburg, PA (US)

(72) Inventors: Alcides Jose Dias, Bee Cave, TX (US); Jason E. Lewis, Wimberley, TX (US); David J. Knapp, Austin, TX (US); Horace C. Ho, Austin, TX (US)

(73) Assignee: Lutron Technology Company LLC, Coopersburg, PA (US)

( * ) Notice: This patent is subject to a terminal disclaimer.

(21) Appl. No.: 16/205,071

(22) Filed: Nov. 29, 2018

Related U.S. Patent Documents

Reissue of:
(64) Patent No.: 9,510,416
Issued: Nov. 29, 2016
Appl. No.: 14/471,081
Filed: Aug. 28, 2014

(51) Int. Cl.
*H05B 33/08* (2020.01)
*H05B 45/14* (2020.01)
(Continued)

(52) U.S. Cl.
CPC ..... *H05B 45/14* (2020.01); *H05B 45/20* (2020.01); *H05B 45/22* (2020.01); *H05B 45/37* (2020.01); *H05B 45/00* (2020.01)

(58) Field of Classification Search
CPC combination set(s) only.
See application file for complete search history.

(56) References Cited

U.S. PATENT DOCUMENTS 4,029,976 A 6/1977 Fish et al.
4,402,090 A 8/1983 Gfeller et al.
(Continued)

FOREIGN PATENT DOCUMENTS

CN 1291282 4/2001
CN 1396616 2/2003
(Continued)

OTHER PUBLICATIONS

International Search Report & Written Opinion, PCT/US2010/000219, dated Oct. 12, 2010.
(Continued)

*Primary Examiner* — Angela M Lie
(74) *Attorney, Agent, or Firm* — Condo Roccia Koptiw LLP

(57) ABSTRACT

An illumination device and method is provided herein for controlling an LED illumination device, so that a desired luminous flux and a desired chromaticity of the device can be maintained over time as the LEDs age. According to one embodiment, the method determines an expected wavelength value and an expected intensity value for each emission LED included within the illumination device at the drive current currently applied to the emission LED and the present emitter forward voltage. In addition, the method determines a photodetector responsivity for each emission LED at the expected wavelength value and the present photodetector forward voltage. The photodetector responsivity calculated for each emission LED is used as a reference for adjusting the lumen output of the emission LED to account for LED aging affects.

33 Claims, 13 Drawing Sheets

(51) Int. Cl.

| | |
|---|---|
| ***H05B 45/20*** | (2020.01) |
| ***H05B 45/37*** | (2020.01) |
| ***H05B 45/22*** | (2020.01) |
| *H05B 45/00* | (2022.01) |

(56) References Cited

U.S. PATENT DOCUMENTS 4,713,841 A 12/1987 Porter et al.
4,744,672 A 5/1988 Turskey et al.
4,745,402 A 5/1988 Auerbach
4,809,359 A 2/1989 Dockery
5,018,057 A 5/1991 Biggs et al.
5,103,466 A 4/1992 Bazes
5,181,015 A 1/1993 Marshall et al.
5,193,201 A 3/1993 Tymes
5,218,356 A 6/1993 Knapp
5,299,046 A 3/1994 Spaeth et al.
5,317,441 A 5/1994 Sidman
5,541,759 A 7/1996 Neff et al.
5,619,262 A 4/1997 Uno
5,657,145 A 8/1997 Smith
5,797,085 A 8/1998 Beuk et al.
5,905,445 A 5/1999 Gurney et al.
6,016,038 A 1/2000 Mueller et al.
6,067,595 A 5/2000 Lindenstruth
6,069,929 A 5/2000 Yabe et al.
6,084,231 A 7/2000 Popat
6,094,014 A 7/2000 Bucks et al.
6,094,340 A 7/2000 Min
6,108,114 A 8/2000 Gilliland et al.
6,127,783 A 10/2000 Pashley et al.
6,147,458 A 11/2000 Bucks et al.
6,150,774 A 11/2000 Mueller et al.
6,234,645 B1 5/2001 Borner et al.
6,234,648 B1 5/2001 Borner et al.
6,250,774 B1 6/2001 Begemann et al.
6,333,605 B1 12/2001 Grouev et al.
6,344,641 B1 2/2002 Blalock et al.
6,356,774 B1 3/2002 Bernstein et al.
6,359,712 B1 3/2002 Kamitani
6,384,545 B1 5/2002 Lau
6,396,815 B1 5/2002 Greaves et al.
6,414,661 B1 7/2002 Shen et al.
6,441,558 B1 8/2002 Muthu et al.
6,448,550 B1 9/2002 Nishimura
6,495,964 B1 12/2002 Muthu et al.
6,498,440 B2 12/2002 Stam et al.
6,513,949 B1 2/2003 Marshall et al.
6,577,512 B2 6/2003 Tripathi et al.
6,617,795 B2 9/2003 Bruning
6,636,003 B2 10/2003 Rahm et al.
6,639,574 B2 10/2003 Scheibe
6,664,744 B2 12/2003 Dietz
6,692,136 B2 2/2004 Marshall et al.
6,741,351 B2 5/2004 Marshall et al.
6,753,661 B2 6/2004 Muthu et al.
6,788,011 B2 9/2004 Mueller et al.
6,806,659 B1 10/2004 Mueller et al.
6,831,569 B2 12/2004 Wang et al.
6,831,626 B2 12/2004 Nakamura et al.
6,853,150 B2 2/2005 Clauberg et al.
6,879,263 B2 4/2005 Pederson et al.
6,965,205 B2 11/2005 Piepgras et al.
6,969,954 B2 11/2005 Lys
6,975,079 B2 12/2005 Lys et al.
7,006,768 B1 2/2006 Franklin
7,014,336 B1 3/2006 Ducharme et al.
7,038,399 B2 5/2006 Lys et al.
7,046,160 B2 5/2006 Pederson et al.
7,072,587 B2 7/2006 Dietz et al.
7,088,031 B2 8/2006 Brantner et al.
7,119,500 B2 10/2006 Young
7,135,824 B2 11/2006 Lys et al.
7,161,311 B2 1/2007 Mueller et al.
7,166,966 B2 1/2007 Naugler, Jr. et al.
7,194,209 B1 3/2007 Robbins et al.
7,233,115 B2 6/2007 Lys
7,233,831 B2 6/2007 Blackwell
7,252,408 B2 8/2007 Mazzochette et al.
7,255,458 B2 8/2007 Ashdown
7,256,554 B2 8/2007 Lys
7,262,559 B2 8/2007 Tripathi et al.
7,294,816 B2 11/2007 Ng et al.
7,315,139 B1 1/2008 Selvan et al.
7,319,298 B2 1/2008 Jungwirth et al.
7,329,998 B2 2/2008 Jungwirth
7,330,002 B2 2/2008 Joung
7,330,662 B2 2/2008 Zimmerman
7,352,972 B2 4/2008 Franklin
7,358,706 B2 4/2008 Lys
7,359,640 B2 4/2008 Onde et al.
7,362,320 B2 4/2008 Payne et al.
7,372,859 B2 5/2008 Hall et al.
7,391,406 B2 6/2008 Yamamoto et al.
7,400,310 B2 7/2008 LeMay
7,445,340 B2 11/2008 Conner et al.
7,511,695 B2 3/2009 Furukawa et al.
7,525,611 B2 4/2009 Zagar et al.
7,553,033 B2 6/2009 Seki
7,554,514 B2 6/2009 Nozawa
7,573,210 B2 8/2009 Ashdown et al.
7,583,901 B2 9/2009 Nakagawa et al.
7,606,451 B2 10/2009 Morita
7,607,798 B2 10/2009 Panotopoulos
7,619,193 B2 11/2009 Deurenberg
7,649,527 B2 1/2010 Cho et al.
7,656,371 B2 2/2010 Shimizu et al.
7,659,672 B2 2/2010 Yang
7,683,864 B2 3/2010 Lee et al.
7,701,151 B2 4/2010 Petrucci et al.
7,705,541 B2 4/2010 Watanabe et al.
7,733,488 B1 6/2010 Johnson
7,737,936 B2 6/2010 Daly
7,801,600 B1 9/2010 Carbunaru et al.
7,828,479 B1 11/2010 Aslan et al.
8,013,538 B2 9/2011 Zampini et al.
8,018,135 B2 9/2011 Van De Ven et al.
8,035,603 B2 10/2011 Furukawa et al.
8,040,299 B2 10/2011 Kretz et al.
8,044,899 B2 10/2011 Ng et al.
8,044,918 B2 10/2011 Choi
8,057,072 B2 11/2011 Takenaka et al.
8,075,182 B2 12/2011 Dai et al.
8,076,869 B2 12/2011 Shatford et al.
8,159,150 B2 4/2012 Ashdown et al.
8,174,197 B2 5/2012 Ghanem et al.
8,174,205 B2 5/2012 Myers et al.
8,264,171 B1 9/2012 Domer
8,283,876 B2 10/2012 Ji
8,287,150 B2 10/2012 Schaefer et al.
8,299,722 B2 10/2012 Melanson
8,358,075 B2 1/2013 Sejkora et al.
8,362,707 B2 1/2013 Draper et al.
8,471,496 B2 6/2013 Knapp
8,521,035 B2 8/2013 Knapp et al.
8,546,842 B2 10/2013 Higuma et al.
8,556,438 B2 10/2013 McKenzie et al.
8,569,974 B2 10/2013 Chobot
8,595,748 B1 11/2013 Haggerty et al.
8,624,527 B1 * 1/2014 Meir ..... H05B 45/20 315/318
8,633,655 B2 1/2014 Kao et al.
8,643,043 B2 2/2014 Shimizu et al.
8,646,940 B2 2/2014 Jang
8,653,758 B2 2/2014 Radermacher et al.
8,657,463 B2 2/2014 Lichten et al.
8,659,237 B2 * 2/2014 Archenhold ..... H05B 45/385 315/297
8,680,787 B2 3/2014 Veskovic
8,704,666 B2 4/2014 Baker, Jr.
8,721,115 B2 5/2014 Ing et al.
8,749,172 B2 6/2014 Knapp
8,773,032 B2 7/2014 May et al.
8,791,647 B2 7/2014 Kesterson et al.

(56) References Cited

U.S. PATENT DOCUMENTS 8,807,792 B2 8/2014 Cho et al.
8,816,600 B2 8/2014 Elder
8,820,962 B2 9/2014 Kang
8,911,160 B2 12/2014 Seo et al.
9,004,724 B2 4/2015 Gao
9,074,751 B2 7/2015 Son et al.
9,084,310 B2 7/2015 Bedell et al.
9,155,155 B1 10/2015 Ho et al.
9,210,750 B2 * 12/2015 Van Der Veen ..... H05B 45/18
9,237,620 B1 1/2016 Knapp et al.
9,247,605 B1 1/2016 Ho et al.
9,332,598 B1 5/2016 Ho et al.
9,337,925 B2 5/2016 Pickard et al.
9,345,097 B1 5/2016 Ho et al.
9,360,174 B2 6/2016 Dong et al.
9,392,660 B2 7/2016 Dias et al.
9,392,663 B2 7/2016 Knapp et al.
9,485,813 B1 11/2016 Lewis et al.
9,497,808 B2 11/2016 Murata et al.
9,500,324 B2 11/2016 Dong
9,510,416 B2 11/2016 Dias et al.
9,538,619 B2 1/2017 Raneri et al.
9,557,214 B2 1/2017 Ho et al.
9,578,724 B1 2/2017 Knapp et al.
9,651,632 B1 5/2017 Knapp et al.
9,736,895 B1 8/2017 Dong et al.
9,736,903 B2 8/2017 Lewis et al.
9,769,899 B2 9/2017 Ho et al.
9,888,543 B2 2/2018 Chitta et al.
9,954,435 B2 4/2018 Knauss et al.
10,595,372 B2 3/2020 Ho et al.
2001/0020123 A1 9/2001 Diab et al.
2001/0030668 A1 10/2001 Erten et al.
2002/0014643 A1 2/2002 Kubo et al.
2002/0033981 A1 3/2002 Keller et al.
2002/0047624 A1 4/2002 Stam et al.
2002/0049933 A1 4/2002 Nyu
2002/0134908 A1 9/2002 Johnson
2002/0138850 A1 9/2002 Basil et al.
2002/0171608 A1 11/2002 Kanai et al.
2003/0103413 A1 6/2003 Jacobi, Jr. et al.
2003/0122749 A1 7/2003 Booth, Jr. et al.
2003/0133491 A1 7/2003 Shih
2003/0179721 A1 9/2003 Shurmantine et al.
2004/0044709 A1 3/2004 Cabrera et al.
2004/0052076 A1 3/2004 Mueller et al.
2004/0052299 A1 3/2004 Jay et al.
2004/0101312 A1 5/2004 Cabrera
2004/0136682 A1 7/2004 Watanabe
2004/0201793 A1 10/2004 Anandan et al.
2004/0220922 A1 11/2004 Lovison et al.
2004/0257311 A1 12/2004 Kanai et al.
2005/0004727 A1 1/2005 Remboski et al.
2005/0030203 A1 2/2005 Sharp et al.
2005/0030267 A1 2/2005 Tanghe et al.
2005/0053378 A1 3/2005 Stanchfield et al.
2005/0077838 A1 4/2005 Blumel
2005/0110777 A1 5/2005 Geaghan et al.
2005/0169643 A1 8/2005 Franklin
2005/0200292 A1 9/2005 Naugler, Jr. et al.
2005/0207157 A1 9/2005 Tani
2005/0242742 A1 11/2005 Cheang et al.
2005/0265731 A1 12/2005 Keum et al.
2006/0061288 A1 3/2006 Zwanenburg et al.
2006/0145887 A1 7/2006 McMahon
2006/0164291 A1 7/2006 Gunnarsson
2006/0198463 A1 9/2006 Godin
2006/0220990 A1 10/2006 Coushaine et al.
2006/0227085 A1 10/2006 Boldt, Jr. et al.
2007/0040512 A1 2/2007 Jungwirth et al.
2007/0109239 A1 5/2007 den Boer et al.
2007/0132592 A1 6/2007 Stewart et al.
2007/0139957 A1 6/2007 Haim et al.
2007/0248180 A1 10/2007 Bowman et al.
2007/0254694 A1 11/2007 Nakagwa et al.
2007/0279346 A1 12/2007 den Boer et al.
2007/0284994 A1 12/2007 Morimoto et al.
2008/0061717 A1 3/2008 Bogner et al.
2008/0078733 A1 4/2008 Nearman et al.
2008/0107029 A1 5/2008 Hall et al.
2008/0120559 A1 5/2008 Yee
2008/0136334 A1 6/2008 Robinson et al.
2008/0136770 A1 6/2008 Peker et al.
2008/0136771 A1 6/2008 Chen et al.
2008/0150864 A1 6/2008 Bergquist
2008/0186898 A1 8/2008 Petite
2008/0222367 A1 9/2008 Co
2008/0235418 A1 9/2008 Werthen et al.
2008/0253766 A1 10/2008 Yu et al.
2008/0265799 A1 10/2008 Sibert
2008/0297070 A1 12/2008 Kuenzler et al.
2008/0304833 A1 12/2008 Zheng
2008/0309255 A1 12/2008 Myers et al.
2008/0317475 A1 12/2008 Pederson et al.
2009/0016390 A1 1/2009 Sumiyama et al.
2009/0026978 A1 1/2009 Robinson
2009/0040154 A1 2/2009 Scheibe
2009/0049295 A1 2/2009 Erickson et al.
2009/0051496 A1 2/2009 Pahlavan et al.
2009/0121238 A1 5/2009 Peck
2009/0171571 A1 7/2009 Son et al.
2009/0196282 A1 8/2009 Fellman et al.
2009/0245101 A1 10/2009 Kwon et al.
2009/0278789 A1 11/2009 Declercq et al.
2009/0284511 A1 11/2009 Takasugi et al.
2009/0303972 A1 12/2009 Flammer, III et al.
2010/0005533 A1 1/2010 Shamir
2010/0020264 A1 1/2010 Ohkawa
2010/0054748 A1 3/2010 Sato
2010/0061734 A1 3/2010 Knapp
2010/0096447 A1 4/2010 Kwon et al.
2010/0134021 A1 6/2010 Ayres
2010/0134024 A1 6/2010 Brandes
2010/0141159 A1 6/2010 Shiu et al.
2010/0182294 A1 7/2010 Roshan et al.
2010/0188443 A1 7/2010 Lewis et al.
2010/0188972 A1 7/2010 Knapp
2010/0194299 A1 8/2010 Ye et al.
2010/0213856 A1 8/2010 Mizusako
2010/0272437 A1 10/2010 Yoon et al.
2010/0301777 A1 12/2010 Kraemer
2010/0327764 A1 12/2010 Knapp ..... H04L 12/437
315/250
2011/0031894 A1 2/2011 Van De Ven
2011/0044343 A1 2/2011 Sethuram et al.
2011/0052214 A1 3/2011 Shimada et al.
2011/0062874 A1 3/2011 Knapp
2011/0063214 A1 3/2011 Knapp
2011/0063268 A1 3/2011 Knapp
2011/0068699 A1 3/2011 Knapp
2011/0069094 A1 3/2011 Knapp ..... H05B 45/20
345/690
2011/0069960 A1 3/2011 Knapp et al. ..... H04L 12/437
398/103
2011/0084701 A1 * 4/2011 Bancken ..... H05B 45/18
324/414
2011/0133654 A1 6/2011 McKenzie et al.
2011/0148315 A1 6/2011 Van Der Veen et al.
2011/0150028 A1 6/2011 Nguyen et al.
2011/0187281 A1 8/2011 Lu
2011/0241572 A1 10/2011 Zhang et al.
2011/0248640 A1 10/2011 Welten
2011/0253915 A1 10/2011 Knapp
2011/0299854 A1 12/2011 Jonsson et al.
2011/0309754 A1 12/2011 Ashdown et al. ..... H05B 45/22
315/151
2012/0001570 A1 * 1/2012 Deurenberg ..... H05B 45/14
315/307
2012/0056545 A1 3/2012 Radermacher et al.
2012/0153839 A1 6/2012 Farley et al.
2012/0229032 A1 9/2012 Van De Ven et al.
2012/0286694 A1 11/2012 Elder
2012/0299481 A1 11/2012 Stevens
2012/0306370 A1 12/2012 Van De Ven et al.

(56) References Cited

U.S. PATENT DOCUMENTS

| | | | |
|---|---|---|---|
| 2013/0009551 | A1 | 1/2013 | Knapp |
| 2013/0016978 | A1 | 1/2013 | Son et al. |
| 2013/0088522 | A1 | 4/2013 | Gettemy et al. |
| 2013/0201690 | A1 | 8/2013 | Vissenberg et al. |
| 2013/0257314 | A1 | 10/2013 | Alvord et al. |
| 2013/0293147 | A1 | 11/2013 | Rogers et al. |
| 2014/0028377 | A1 | 1/2014 | Rosik et al. |
| 2014/0225529 | A1 | 8/2014 | Beczkowski |
| 2014/0333202 | A1 | 11/2014 | Hechtfischer |
| 2015/0022110 | A1 | 1/2015 | Sisto |
| 2015/0055960 | A1 | 2/2015 | Zheng et al. |
| 2015/0155459 | A1 | 6/2015 | Ishihara et al. |
| 2015/0312990 | A1 | 10/2015 | van de Ven et al. |
| 2015/0351187 | A1 | 12/2015 | Mcbryde et al. |
| 2015/0377695 | A1 | 12/2015 | Chang et al. |
| 2015/0377699 | A1 | 12/2015 | Ho et al. |
| 2015/0382425 | A1 | 12/2015 | Lewis et al. |
| 2016/0066383 | A1 | 3/2016 | Dias et al. |
| 2017/0105260 | A1 | 4/2017 | Ho et al. |
| 2018/0084617 | A1 | 3/2018 | Zhang et al. |
| 2018/0160491 | A1 | 6/2018 | Biery et al. |

FOREIGN PATENT DOCUMENTS

| | | | |
|---|---|---|---|
| CN | 1573881 | | 2/2005 |
| CN | 1596054 | A | 3/2005 |
| CN | 1650673 | | 8/2005 |
| CN | 1830096 | A | 9/2006 |
| CN | 1849707 | | 10/2006 |
| CN | 101083866 | | 12/2007 |
| CN | 101150904 | | 3/2008 |
| CN | 101331798 | | 12/2008 |
| CN | 101458067 | | 6/2009 |
| CN | 101772988 | A | 7/2010 |
| CN | 102422711 | A | 4/2012 |
| CN | 102573214 | A | 7/2012 |
| CN | 102625944 | A | 8/2012 |
| CN | 102695332 | A | 9/2012 |
| CN | 103718005 | A | 4/2014 |
| DE | 102007036978 | | 2/2009 |
| EP | 0196347 | | 10/1986 |
| EP | 0456462 | | 11/1991 |
| EP | 0677983 | A2 | 10/1995 |
| EP | 1482770 | | 12/2004 |
| EP | 2273851 | | 1/2011 |
| EP | 2273851 | A2 | 1/2011 |
| GB | 2307577 | | 5/1997 |
| JP | 06-302384 | | 10/1994 |
| JP | 08-201472 | | 8/1996 |
| JP | 11-025822 | | 1/1999 |
| JP | 2001-514432 | | 9/2001 |
| JP | 2004-325643 | | 11/2004 |
| JP | 2005-539247 | | 12/2005 |
| JP | 2006-260927 | | 9/2006 |
| JP | 2007-266974 | | 10/2007 |
| JP | 2007-267037 | | 10/2007 |
| JP | 2008-507150 | | 3/2008 |
| JP | 2008-300152 | | 12/2008 |
| JP | 2009-134877 | | 6/2009 |
| WO | 00/37904 | | 6/2000 |
| WO | 03/075617 | | 9/2003 |
| WO | 2005/024898 | | 3/2005 |
| WO | 2007004108 | | 1/2007 |
| WO | 2007/069149 | | 6/2007 |
| WO | 2008/065607 | | 6/2008 |
| WO | 2008/129453 | | 10/2008 |
| WO | 2010/124315 | | 11/2010 |
| WO | 2011016860 | A1 | 2/2011 |
| WO | 2012/005771 | | 1/2012 |
| WO | 2012/042429 | | 4/2012 |
| WO | 2013/142437 | | 9/2013 |

OTHER PUBLICATIONS

International Search Report & Written Opinion, PCT/US2010/002171, dated Nov. 24, 2010.
International Search Report & Written Opinion, PCT/US2010/004953, dated Mar. 22, 2010.
International Search Report & Written Opinion, PCT/US2010/001919, dated Feb. 24, 2011.
Office Action dated May 12, 2011 for U.S. Appl. No. 12/360,467.
Final Office Action dated Nov. 28, 2011 for U.S. Appl. No. 12/360,467.
Notice of Allowance dated Jan. 20, 2012 for U.S. Appl. No. 12/360,467.
Office Action dated Feb. 1, 2012 for U.S. Appl. No. 12/584,143.
Final Office Action dated Sep. 12, 2012 for U.S. Appl. No. 12/584,143.
Office Action dated Aug. 2, 2012 for U.S. Appl. No. 12/806,114.
Office Action dated Oct. 2, 2012 for U.S. Appl. No. 12/806,117.
Office Action dated Jul. 11, 2012 for U.S. Appl. No. 12/806,121.
Final Office Action dated Oct. 11, 2012 for U.S. Appl. No. 12/806,121.
Office Action dated Dec. 17, 2012 for U.S. Appl. No. 12/806,118.
Office Action dated Oct. 9, 2012 for U.S. Appl. No. 12/806,126.
Office Action dated Jul. 10, 2012 for U.S. Appl. No. 12/806,113.
Notice of Allowance dated Oct. 15, 2012 for U.S. Appl. No. 12/806,113.
International Search Report & Written Opinion dated Sep. 19, 2012 for PCT/US2012/045392.
Partial International Search Report dated Nov. 16, 2012 for PCT/US2012/052774.
Office Action dated Nov. 4, 2013 for CN Application No. 201080032373.7.
Office Action dated Dec. 4, 2013 for U.S. Appl. No. 12/803,805.
Notice of Allowance dated Jan. 28, 2014 for U.S. Appl. No. 13/178,686.
Notice of Allowance dated Feb. 21, 2014 for U.S. Appl. No. 12/806,118.
Office Action dated Apr. 22, 2014 for U.S. Appl. No. 12/806,114.
International Search Report & Written Opinion for PCT/US2012/052774 dated Feb. 4, 2013.
Notice of Allowance dated Feb. 4, 2013 for U.S. Appl. No. 12/809,113.
Notice of Allowance dated Feb. 25, 2013 for U.S. Appl. No. 12/806,121.
Notice of Allowance dated May 3, 2013 for U.S. Appl. No. 12/806,126.
International Search Report & Written Opinion, PCT/US2013/027157, dated May 16, 2013.
Office Action dated Jun. 10, 2013 for U.S. Appl. No. 12/924,628.
Office Action dated Jun. 27, 2013 for U.S. Appl. No. 13/178,686.
Final Office Action dated Jul. 9, 2013 for U.S. Appl. No. 12/806,118.
Final Office Action dated Jun. 14, 2013 for U.S. Appl. No. 12/806,117.
Johnson, "Visibile Light Communications," CTC Tech Brief, Nov. 2009, 2 pages.
Chonko, "Use Forward Voltage Drop to Measure Junction Temperature," © 2013 Penton Media, Inc., 5 pages.
Office Action dated Oct. 24, 2013 for U.S. Appl. No. 12/806,117.
Notice of Allowance dated Oct. 31, 2013 for U.S. Appl. No. 12/924,628.
Office Action dated Nov. 12, 2013 for U.S. Appl. No. 13/231,077.
Final Office Action dated Jun. 18, 2014 for U.S. Appl. No. 13/231,077.
Office Action dated Jun. 23, 2014 for U.S. Appl. No. 12/806,117.
Notice of Allowance dated Aug. 21, 2014 for U.S. Appl. No. 12/584,143.
Office Action dated Sep. 10, 2014 for U.S. Appl. No. 12/803,805.
Office Action dated Jan. 28, 2015 for U.S. Appl. No. 12/806,117.
Office Action dated Feb. 2, 2015 for CN Application 201080035731.
Office Action dated Jul. 1, 2014 for JP Application 2012-520587.
Office Action dated Feb. 17, 2015 for JP Application 2012-520587.
Office Action dated Mar. 11, 2014 for JP Application 2012-523605.
Office Action dated Sep. 24, 2014 for JP Application 2012-523605.
Office Action dated Mar. 25, 2015 for U.S. Appl. No. 14/305,472.
Notice of Allowance dated Mar. 30, 2015 for U.S. Appl. No. 14/097,355.
Office Action dated Apr. 8, 2015 for U.S. Appl. No. 14/305,456.

(56) References Cited

OTHER PUBLICATIONS

Notice of Allowance dated May 22, 2015 for U.S. Appl. No. 14/510,212.
Office Action dated May 27, 2015 for U.S. Appl. No. 12/806,117.
Partial International Search Report dated Mar. 27, 2015 for PCT/US2014/068556.
International Search Report & Written Opinion for PCT/US2014/068556 dated Jun. 22, 2015.
Final Office Action for U.S. Appl. No. 12/803,805 dated Jun. 23, 2015.
Office Action for U.S. Appl. No. 13/970,964 dated Jun. 29, 2015.
Office Action for U.S. Appl. No. 14/510,243 dated Jul. 28, 2015.
Office Action for U.S. Appl. No. 14/510,266 dated Jul. 31, 2015.
Office Action for U.S. Appl. No. 13/970,990 dated Aug. 20, 2015.
Partial International Search Report for PCT/US2015/037660 dated Aug. 21, 2015.
Final Office Action for U.S. Appl. No. 13/773,322 dated Sep. 2, 2015.
Notice of Allowance for U.S. Appl. No. 13/970,944 dated Sep. 11, 2015.
Notice of Allowance for U.S. Appl. No. 14/604,886 dated Sep. 25, 2015.
Notice of Allowance for U.S. Appl. No. 14/604,881 dated Oct. 9, 2015.
International Search Report & Written Opinion for PCT/US2015/037660 dated Oct. 28, 2015.
Office Action for U.S. Appl. No. 14/573,207 dated Nov. 4, 2015.
Notice of Allowance for U.S. Appl. No. 14/510,243 dated Nov. 6, 2015.
Notice of Allowance for U.S. Appl. No. 12/806,117 dated Nov. 18, 2015.
Partial International Search Report for PCT/US2015/045252 dated Nov. 18, 2015.
Office Action dated Mar. 6, 2015 for U.S. Appl. No. 13/733,322.
International Search Report and the Written Opinion for PCT/US2015/035081 dated Jan. 26, 2016.
International Search Report and the Written Opinion for PCT/US2015/045252 dated Jan. 26, 2016.
Reissue U.S. Appl. No. 16/282,231 on Feb. 21, 2019.
Reissue U.S. Appl. No. 16/033,917 on Jul. 12, 2018.
Reissue U.S. Appl. No. 15/970,436 on May 3, 2018.
Reissue U.S. Appl. No. 15/982,681 on May 17, 2018.
Office Action for U.S. Appl. No. 14/510,283 dated Jul. 29, 2015.
U.S. Appl. No. 16/819,497, filed Mar. 16, 2020.
"Notice of Allowance dated Feb. 4, 2013 for U.S. Appl. No. 12/806,113".
Search Report, Chinese Patent Application CN 2018112133483 A, dated Mar. 24, 2021.
Bouchet et al., "Visible-light communication system enabling 73 Mb/s data streaming," IEEE Globecom Workshop on Optical Wireless Communications, 2010, pp. 1042-1046.
International Search Report & Written Opinion for PCT/US2015/037660 mailed Oct. 28, 2015.
Office Action for U.S. Appl. No. 14/573,207 mailed Nov. 4, 2015.
Notice of Allowance for U.S. Appl. No. 14/510,243 mailed Nov. 6, 2015.
Notice of Allowance for U.S. Appl. No. 12/806,117 mailed Nov. 18, 2015.
Partial International Search Report for PCT/US2015/045252 mailed Nov. 18, 2015.
International Search Report and the Written Opinion for PCT/US2015/045252 mailed Jan. 26, 2016.
Final Office Action mailed Jan. 28, 2015 for U.S. Appl. No. 12/806,117.
Office Action mailed Mar. 6, 2015 for U.S. Appl. No. 13/773,322.
Office Action mailed Feb. 2, 2015 for CN Application 201080035731.X.
Office Action mailed Jul. 1, 2014 for JP Application 2012-520587.
Office Action mailed Feb. 17, 2015 for JP Application 2012-520587.
"LED Fundamentals, How to Read a Datasheet (Part 2 of 2) Characteristic Curves, Dimensions and Packaging," Aug. 19, 2011, OSRAM Opto Semiconductors, 17 pages.
Hall et al., "Jet Engine Control Using Ethernet with a Brain (Postprint)," AIAA/ASME/SAE/ASEE Joint Propulsion Conference and Exhibition, Jul. 2008, pp. 1-18.
Kebemou, "A Partitioning-Centric Approach for the Modeling and the Methodical Design of Automotive Embedded System Architectures," Dissertation of Technical University of Berlin, 2008, 176 pages.
O'Brien et al., "Visible Light Communications and Other Developments in Optical Wireless," Wireless World Research Forum, 2006, 26 pages.
Zalewski et al., "Safety Issues in Avionics and Automotive Databuses," IFAC World Congress, Jul. 2005, 6 pages.
"Visible Light Communication: Tutorial," Project IEEE P802.15 Working Group for Wireless Personal Area Networks (WPANs), Mar. 2008.
Johnson, "Visible Light Communications," CTC Tech Brief, Nov. 2009, 2 pages.
Notice of Allowance mailed Oct. 15, 2012 for U.S. Appl. No. 12/806,113.
International Search Report & Written Opinion mailed Sep. 19, 2012 for PCT/US2012/045392.
Partial International Search Report mailed Nov. 16, 2012 for PCT/US2012/052774.
International Search Report & Written Opinion for PCT/US2012/052774 mailed Feb. 4, 2013.
Notice of Allowance mailed Feb. 4, 2013 for U.S. Appl. No. 12/806,113.
Notice of Allowance mailed Feb. 25, 2013 for U.S. Appl. No. 12/806,121.
Notice of Allowance mailed May 3, 2013 for U.S. Appl. No. 12/806,126.
International Search Report & Written Opinion, PCT/US2013/027157, May 16, 2013.
Office Action mailed Jun. 10, 2013 for U.S. Appl. No. 12/924,628.
Final Office Action mailed Jun. 14, 2013 for U.S. Appl. No. 12/806,117.
Office Action mailed Jun. 27, 2013 for U.S. Appl. No. 13/178,686.
Final Office Action mailed Jul. 9, 2013 for U.S. Appl. No. 12/806,118.
Office Action mailed Oct. 24, 2013 for U.S. Appl. No. 12/806,117.
Notice of Allowance mailed Oct. 31, 2013 for U.S. Appl. No. 12/924,628.
Office Action mailed Nov. 12, 2013 for U.S. Appl. No. 13/231,077.
Office Action mailed Dec. 4, 2013 for U.S. Appl. No. 12/803,805.
Office Action mailed Nov. 4, 2013 for CN Application No. 201080032373.7.
Notice of Allowance mailed Jan. 28, 2014 for U.S. Appl. No. 13/178,686.
Notice of Allowance mailed Feb. 21, 2014 for U.S. Appl. No. 12/806,118.
Office Action mailed Apr. 22, 2014 for U.S. Appl. No. 12/806,114.
Final Office Action mailed Jun. 18, 2014 for U.S. Appl. No. 13/231,077.
Office Action mailed Jun. 23, 2014 for U.S. Appl. No. 12/806,117.
Notice of Allowance mailed Aug. 21, 2014 for U.S. Appl. No. 12/584,143.
Office Action mailed Sep. 10, 2014 for U.S. Appl. No. 12/803,805.
"Color Management of a Red, Green, and Blue LED Combinational Light Source," Avago Technologies, Mar. 2010, pp. 1-8.

* cited by examiner

| Temp | Drive | Param | LED1 | LED2 | LED3 |
|---|---|---|---|---|---|
| T0 | *I0* | Luma | x | x | x |
| | | X chrom | x | x | x |
| | | Y chrom | x | x | x |
| | | **λ** | **x** | **x** | **x** |
| | | **Intensity** | **x** | **x** | **x** |
| | | **Vfe** | **x** | **x** | **x** |
| | ⋮ | | | | |
| | *IN* | Luma | x | x | x |
| | | X chrom | x | x | x |
| | | Y chrom | x | x | x |
| | | **λ** | **x** | **x** | **x** |
| | | **Intensity** | **x** | **x** | **x** |
| | | **Vfe** | **x** | **x** | **x** |
| T1 | *I0* | Luma | x | x | x |
| | | X chrom | x | x | x |
| | | Y chrom | x | x | x |
| | | **λ** | **x** | **x** | **x** |
| | | **Intensity** | **x** | **x** | **x** |
| | | **Vfe** | **x** | **x** | **x** |
| | ⋮ | | | | |
| | *IN* | Luma | x | x | x |
| | | X chrom | x | x | x |
| | | Y chrom | x | x | x |
| | | **λ** | **x** | **x** | **x** |
| | | **Intensity** | **x** | **x** | **x** |
| | | **Vfe** | **x** | **x** | **x** |
| | | ***m*** | **x** | **x** | **x** |
| | | ***km*** | **x** | **x** | **x** |
| | | ***b*** | **x** | **x** | **x** |
| | | ***d*** | **x** | **x** | **x** |

*FIG. 12*

LED ILLUMINATION DEVICE AND METHOD FOR ACCURATELY CONTROLLING THE INTENSITY AND COLOR POINT OF THE ILLUMINATION DEVICE OVER TIME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue of U.S. Pat. No. 9,510,416, issued on Nov. 29, 2016 from U.S. patent application Ser. No. 14/471,081, filed Aug. 28, 2014, which is hereby incorporated by reference herein in its entirety.*

BACKGROUND OF THE INVENTION

1. Field of the Invention

This invention relates to illumination devices comprising a plurality of light emitting diodes (LEDs) and, more particularly, to illumination devices and methods for calibrating and compensating individual LEDs in the illumination device, so as to obtain a desired luminous flux and chromaticity over time as the LEDs age.

2. Description of the Relevant Art

The following descriptions and examples are provided as background only and are intended to reveal information that is believed to be of possible relevance to the present invention. No admission is necessarily intended, or should be construed, that any of the following information constitutes prior art impacting the patentable character of the subject matter claimed herein.

Lamps and displays using LEDs (light emitting diodes) for illumination are becoming increasingly popular in many different markets. LEDs provide a number of advantages over traditional light sources, such as incandescent and fluorescent light bulbs, including low power consumption, long lifetime, no hazardous materials, and additional specific advantages for different applications. When used for general illumination, LEDs provide the opportunity to adjust the color (e.g., from white, to blue, to green, etc.) or the color temperature (e.g., from "warm white" to "cool white") to produce different lighting effects.

Although LEDs have many advantages over conventional light sources, one disadvantage of LEDs is that their output characteristics (e.g., luminous flux and chromaticity) vary over changes in drive current, temperature and over time as the LEDs age. These effects are particularly evident in multi-colored LED illumination devices, which combine a number of differently colored emission LEDs into a single package.

An example of a multi-colored LED illumination device is one in which two or more different colors of LEDs are combined within the same package to produce white or near-white light. There are many different types of white light lamps on the market, some of which combine red, green and blue (RGB) LEDs, red, green, blue and yellow (RGBY) LEDs, phosphor-converted white and red (WR) LEDs, RGBW LEDs, etc. By combining different colors of LEDs within the same package, and driving the differently colored LEDs with different drive currents, these lamps may be configured to generate white or near-white light within a wide gamut of color points or correlated color temperatures (CCTs) ranging from "warm white" (e.g., roughly 2600K-3700K), to "neutral white" (e.g., 3700K-5000K) to "cool white" (e.g., 5000K-8300K). Some multi-colored LED illumination devices also enable the brightness and/or color of the illumination to be changed to a particular set point. These tunable illumination devices should all produce the same color and color rendering index (CRI) when set to a particular dimming level and chromaticity setting (or color set point) on a standardized chromacity diagram.

A chromaticity diagram maps the gamut of colors the human eye can perceive in terms of chromacity coordinates and spectral wavelengths. The spectral wavelengths of all saturated colors are distributed around the edge of an outlined space (called the "gamut" of human vision), which encompasses all of the hues perceived by the human eye. The curved edge of the gamut is called the spectral locus and corresponds to monochromatic light, with each point representing a pure hue of a single wavelength. The straight edge on the lower part of the gamut is called the line of purples. These colors, although they are on the border of the gamut, have no counterpart in monochromatic light. Less saturated colors appear in the interior of the figure, with white and near-white colors near the center.

In the 1931 CIE Chromaticity Diagram shown in FIG. 1, colors within the gamut of human vision are mapped in terms of chromaticity coordinates (x, y). For example, a red (R) LED with a peak wavelength of 625 nm may have a chromaticity coordinate of (0.69, 0.31), a green (G) LED with a peak wavelength of 528 nm may have a chromaticity coordinate of (0.18, 0.73), and a blue (B) LED with a peak wavelength of 460 nm may have a chromaticity coordinate of (0.14, 0.04). The chromaticity coordinates (i.e., color points) that lie along the blackbody locus obey Planck's equation, $E(\lambda)=A\lambda^{-5}/(e^{(B/T)}-1)$. Color points that lie on or near the blackbody locus provide a range of white or near-white light with color temperatures ranging between approximately 2500K and 10,000K. These color points are typically achieved by mixing light from two or more differently colored LEDs. For example, light emitted from the RGB LEDs shown in FIG. 1 may be mixed to produce a substantially white light with a color temperature in the range of about 2500K to about 5000K. Although an illumination device is typically configured to produce a range of white or near-white color temperatures arranged along the blackbody curve (e.g., about 2500K to 5000K), some illumination devices may be configured to produce any color within the color gamut (triangle) formed by the individual LEDs (e.g., RGB). The chromaticity coordinates of the combined light, e.g., (0.437, 0.404) for 3000K white light, define the target chromaticity or color set point at which the device is intended to operate.

In practice, the luminous flux (i.e., lumen output) and chromaticity produced by prior art illumination devices often differs from the target settings, due to changes in drive current, temperature and over time as the LEDs age. In some devices, the drive current supplied to one or more of the emission LEDs may be adjusted to change the dimming level and/or color point setting of the illumination device. For example, the drive currents supplied to all emission LEDs may be increased to increase the lumen output of the illumination device. In another example, the color point setting of the illumination device may be changed by altering the drive currents supplied to one or more of the emission LEDs. Specifically, an illumination device comprising RGB LEDs may be configured to produce "warmer" white light by increasing the drive current supplied to the red LEDs and decreasing the drive currents supplied to the blue and/or green LEDs.

In addition to affecting changes in the lumen output and/or color point, adjusting the drive current supplied to a given LED inherently affects the junction temperature of that LED. As expected, higher drive currents result in higher junction temperatures (and vice versa). When the junction temperature of an LED increases, the lumen output of the LED generally decreases. For some colors of LEDs (e.g., white, blue and green LEDs), the relationship between luminous flux and junction temperature is relatively linear, while for other colors (e.g., red, orange and especially yellow) the relationship is significantly non-linear.

In addition to luminous flux, the chromaticity of an LED also changes with temperature, due to shifts in the dominant wavelength (for both phosphor converted and non-phosphor converted LEDs) and changes in the phosphor efficiency (for phosphor converted LEDs). In general, the peak emission wavelength of green LEDs tends to decrease with increasing temperature, while the peak emission wavelength of red and blue LEDs tends to increase with increasing temperature. While the change in chromacity is relatively linear with temperature for most colors, red and yellow LEDs tend to exhibit a more significant non-linear change.

While some prior art devices do perform some level of temperature compensation, they fail to provide accurate results by failing to recognize that temperature affects the lumen output and chromaticity of different colors of LEDs differently. Moreover, these prior art devices often fail to account for changes in lumen output and chromaticity that occur gradually over time as the LEDs age.

As LEDs age, the lumen output from both phosphor converted and non-phosphor converted LEDs, and the chromaticity of phosphor converted LEDs, also changes. Early on in life, the luminous flux can either increase (get brighter) or decrease (get dimmer), while late in life, the luminous flux generally decreases. FIGS. 2-3 demonstrate how the lumen output of an exemplary emission LED changes over temperature (e.g., 55° C., 85° C. and 105° C.) and over time (e.g., 1,000 to 100,000 hours) for two different fixed drive currents (e.g., 0.7 A in FIG. 2 and 1.0 A in FIG. 3). As expected, lumen output decreases faster over time when the LED is subjected to higher drive currents and higher temperatures.

As a phosphor converted LED ages, the phosphor becomes less efficient and the amount of blue light that passes through the phosphor increases. This decrease in phosphor efficiency causes the overall color produced by the phosphor converted LED to appear "cooler" over time. Although the dominant wavelength and chromaticity of a non-phosphor converted LED (e.g., a red, green, blue, etc. LED) does not change over time, the lumen output decreases over time as the LED ages (see, FIGS. 2-3), which in effect causes the chromaticity or color set point of a multi-colored LED illumination device to change over time. Without accounting for LED aging affects, prior art devices cannot maintain a desired luminous flux and a desired chromaticity for an LED illumination device over the lifetime of the illumination device.

A need remains for improved illumination devices and methods for calibrating and compensating individual LEDs within an LED illumination device, so as to accurately maintain a desired luminous flux and a desired chromaticity for the illumination device over changes in temperature, changes in drive current and over and time as the LEDs age. This need is particularly warranted in multi-color LED illumination devices, since different colors of LEDs are affected differently by temperature and age, and in tunable illumination devices that enable the target dimming level and/or the target chromaticity setting to be changed by adjusting the drive currents supplied to one or more of the LEDs, since changes in drive current inherently affect the lumen output, color and temperature of the illumination device.

SUMMARY OF THE INVENTION

The following description of various embodiments of an illumination device and a method for controlling an illumination device is not to be construed in any way as limiting the subject matter of the appended claims.

According to one embodiment, a method is provided herein for controlling an LED illumination device, so that a desired luminous flux and a desired chromaticity of the device can be maintained over time as the LEDs age. In general, the illumination device described herein may include a plurality of emission LEDs, or a plurality of chains of emission LEDs, and at least one photodetector. For the sake of simplicity, the term "LED" will be used herein to refer to a single LED or a chain of serially connected LEDs supplied with the same drive current.

According to one embodiment, the method described herein may begin by applying respective drive currents to the plurality of emission LEDs to drive the plurality of emission LEDs substantially continuously to produce illumination, periodically turning the plurality of emission LEDs off for short durations of time to produce periodic intervals, and measuring a forward voltage presently developed across each emission LED, one LED at a time, during a first portion of the periodic intervals. For each emission LED, the method may further include determining an expected wavelength value and an expected intensity value corresponding to the forward voltage measured across the emission LED and the drive current currently applied to the emission LED by applying one or more interpolation techniques to a table of stored calibration values correlating wavelength and intensity to drive current at a plurality of different temperatures.

For each emission LED, the table of stored calibration values may generally comprise a first plurality of stored wavelength values, which were previously detected from the emission LED upon applying a plurality of different drive currents to the emission LED during a calibration phase when the emission LED was subjected to a first ambient temperature, and a second plurality of stored wavelength values, which were previously detected from the emission LED upon applying the plurality of different drive currents to the emission LED during the calibration phase when the emission LED was subjected to a second temperature, which is different than the first ambient temperature. In addition, the table of stored calibration values may include a first plurality of stored forward voltages, which were previously measured across the emission LED before or after each of the different drive currents was applied to the emission LED during the calibration phase when the emission LED was subjected to the first ambient temperature, and a second plurality of stored forward voltages, which were previously measured across the emission LED before or after each of the different drive currents was applied to the emission LED during the calibration phase when the emission LED was subjected the second temperature.

According to one embodiment, an expected wavelength value may be determined for each emission LED by calculating a third plurality of wavelength values corresponding to the forward voltage presently measured across the emission LED by interpolating between the first plurality of stored wavelength values and the second plurality of wavelength values corresponding to the emission LED. In most cases, the third plurality of wavelength values may be calculated using a linear interpolation technique to interpolate between the first and second plurality of stored wavelength values corresponding to the emission LED. Once the third plurality of wavelength values are calculated, the method may generate a relationship between the third plurality of wavelength values, and may select the expected wavelength value from the generated relationship that corresponds to the drive current currently applied to the emission LED.

In some embodiments, a linear interpolation or a non-linear interpolation may be applied to the third plurality of wavelength values to generate a linear relationship or a non-linear relationship between wavelength and drive current for the emission LED. In some cases, application of the linear interpolation or the non-linear interpolation may be based on a color of the emission LED. In an RGB illumination device, e.g., the relationship between wavelength and drive current tends to be relatively linear for red LEDs, but significantly more non-linear for green and blue LEDs. In some cases, a linear interpolation may be selected to generate the relationship between the calculated wavelength values for red LEDs, while a non-linear interpolation is used for green and blue LEDs. In other cases, a piece-wise linear interpolation could be applied to the third plurality of wavelength values to characterize the relationship between the calculated wavelength values for one or more of the LED colors. From each generated relationship, the expected wavelength value may be determined for the drive current currently applied to the emission LED.

For each emission LED, the table of stored calibration values may additionally comprises a first plurality of stored intensity values, which were previously detected from the emission LED upon applying the plurality of different drive currents to the emission LED during the calibration phase when the emission LED was subjected to the first ambient temperature, and a second plurality of stored intensity values, which were previously detected from the emission LED upon applying the plurality of different drive currents to the emission LED during the calibration phase when the emission LED was subjected to the second ambient temperature.

According to one embodiment, an expected intensity value may be determined for each emission LED by calculating a third plurality of intensity values corresponding to the forward voltage presently measured across the emission LED by interpolating between the first plurality of stored intensity values and the second plurality of intensity values corresponding to the emission LED. In most cases, the third plurality of intensity values may be calculated using a linear interpolation technique to interpolate between the first and second plurality of stored intensity values corresponding to the emission LED. Once the third plurality of intensity values are calculated, the method may generate a relationship between the third plurality of intensity values, and may select the expected intensity value from the generated relationship that corresponds to the drive current currently applied to the emission LED.

In some embodiments, the first, second and third plurality of intensity values may comprise radiance values, and the expected intensity value may be an expected radiance value. In other embodiments, the first, second and third plurality of intensity values may comprise luminance values, and the expected intensity value may be an expected luminance value.

In some embodiments, a linear interpolation or a non-linear interpolation may be applied to the third plurality of intensity values to generate a linear relationship or a non-linear relationship between intensity and drive current for each emission LED. In some cases, application of the linear interpolation or the non-linear interpolation may be based on a color of the emission LED. In an RGB illumination device, e.g., the relationship between intensity and drive current tends to be relatively linear for red LEDs, but significantly more non-linear for green and blue LEDs. In some cases, a linear interpolation may be selected to generate the relationship between the third plurality of intensity values for red LEDs, while a non-linear interpolation is used for green and blue LEDs. In other cases, a piece-wise linear interpolation could be used to characterize the relationship between the third plurality of intensity values for one or more of the LED colors. From each generated relationship, the expected intensity value may be determined for the drive current currently applied to the emission LED.

Once the expected wavelength and the expected intensity values are determined for each emission LED at the present drive current and emitter junction temperature (i.e., emitter forward voltage), the compensation method may characterize a responsivity of the photodetector for each emission LED at the expected wavelength and the present detector junction temperature (i.e., photodetector forward voltage). For example, the compensation method may measure a photocurrent induced on the photodetector in response to the illumination produced by each emission LED, one emission LED at a time, and received by the photodetector during a second portion of the periodic intervals. During a third portion of the periodic intervals, a forward voltage presently developed across the photodetector may be measured by applying a non-operative drive current to the photodetector. The forward voltage may be measured before or after the induced photocurrents are measured.

For each emission LED, the compensation method may calculate a photodetector responsivity value using the expected wavelength value determined for the emission LED, the forward voltage presently measured across the photodetector, and a plurality of coefficient values that were generated during a calibration phase and stored within the illumination device to characterize a change in the photodetector responsivity over emitter wavelength and photodetector forward voltage. The calculated photodetector responsivity value may then be used as a reference for adjusting the lumen output of the emission LED to account for LED aging affects.

In order to do so, the compensation method may calculate an intensity value for each emission LED by dividing the induced photocurrent measured during the measuring step by the photodetector responsivity calculated during the calculating step. Next, the method may calculate a scale factor by dividing the expected intensity value determined for the emission LED by the intensity value calculated for the emission LED. Once a scale factor is calculated for each emission LED, the scale factor may be applied to a desired luminous flux value for the emission LED to obtain an adjusted luminous flux value for the emission LED. Next, the drive current currently applied to the emission LED may be adjusted to achieve the adjusted luminous flux value.

According to another embodiment, an illumination device is provided herein having a plurality of emission light emitting diodes (LEDs), an LED driver and receiver circuit, a photodetector, a storage medium and a control circuit. The plurality of emission LEDs may be generally configured to produce illumination for the illumination device. The photodetector may be generally configured for detecting the illumination produced by the plurality of emission LEDs. The storage medium may be generally configured for storing a table of calibration values correlating wavelength and intensity to drive current at a plurality of different temperatures for each of the plurality of emission LEDs. The storage medium may also be configured for storing a plurality of coefficient values that were generated during the calibration phase to characterize a change in the photodetector responsivity over emitter wavelength and photodetector forward voltage. The storage medium and the table of calibration values may be configured, as described above.

The LED driver and receiver circuit may be generally configured for applying respective drive currents to the plurality of emission LEDs to drive the plurality of emission LEDs substantially continuously to produce illumination, and periodically turning the plurality of emission LEDs off for short durations of time to produce periodic intervals. During a first portion of the periodic intervals, the LED driver and receiver circuit may be configured for applying a non-operative drive current to each emission LED, one LED at a time, to measure a forward voltage presently developed across each emission LED. During a second portion of the periodic intervals, the LED driver and receiver circuit may be configured for measuring a photocurrent induced on the photodetector in response to the illumination produced by each emission LED, one emission LED at a time, and received by the photodetector. During a third portion of the periodic intervals, the LED driver and receiver circuit may be configured for measuring a forward voltage presently developed across the photodetector by applying a non-operative drive current to the photodetector. The first, second and third periodic intervals may occur in substantially any order.

The control circuit may be coupled to the LED driver and receiver circuit, the photodetector and the storage medium, and may be generally configured for determining, for each emission LED, an expected wavelength value and an expected intensity value corresponding to the forward voltage presently measured across the emission LED and the drive current currently applied to the emission LED by applying one or more interpolation techniques to the table of stored calibration values. The control circuit may determine the expected wavelength value and the expected intensity value, as described above.

The control circuit may be additionally configured for calculating a photodetector responsivity for each emission LED using the expected wavelength value determined for the emission LED, the forward voltage presently measured across the photodetector, and the plurality of coefficient values that were generated during the calibration phase and stored within the illumination device to characterize the change in the photodetector responsivity over emitter wavelength and photodetector forward voltage. The control circuit may use the photodetector responsivity calculated for each emission LED as a reference for adjusting the lumen output of the emission LED to account for LED aging affects.

In order to do so, the control circuit may calculate an intensity value for each emission LED as a ratio of the induced photocurrent measured by the LED driver and receiver circuit over the photodetector responsivity calculated by the control circuit. Next, the control circuit may calculate a scale factor for each emission LED by dividing the expected intensity value determined for the emission LED by the intensity value calculated for the emission LED. Finally, the control circuit may apply the scale factor to a desired luminous flux value for each emission LED to obtain an adjusted luminous flux value for the emission LED, and may adjust the drive current currently applied to the emission LED to achieve the adjusted luminous flux value.

BRIEF DESCRIPTION OF THE DRAWINGS

Other objects and advantages of the invention will become apparent upon reading the following detailed description and upon reference to the accompanying drawings.

FIG. 12 is a chart illustrating an exemplary table of calibration values that may be obtained in accordance with the calibration method of FIG. 8 and stored within the illumination device;

Figure 1:
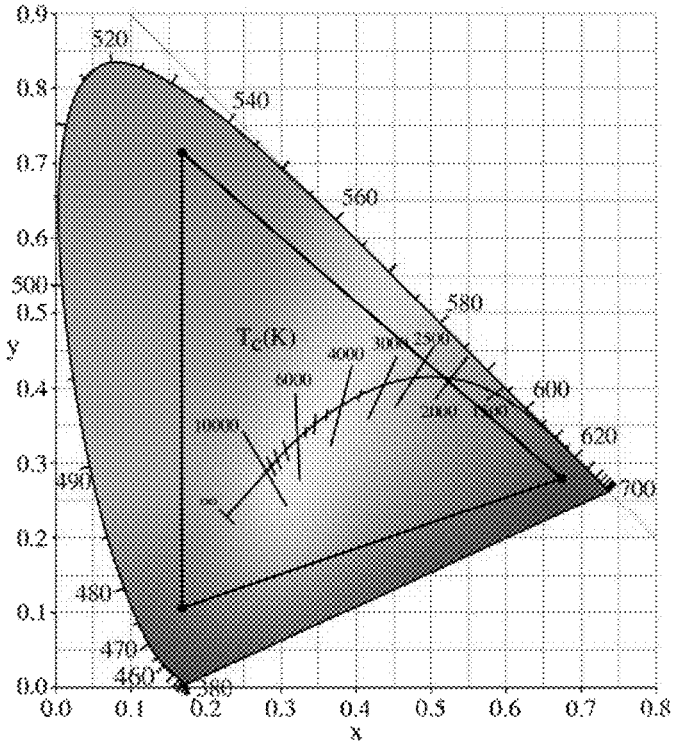
FIG. 1 is a graph of the 1931 CIE chromaticity diagram illustrating the gamut of human color perception and the gamut achievable by an illumination device comprising a plurality of multiple color LEDs (e.g., red, green and blue)
Figure 2:
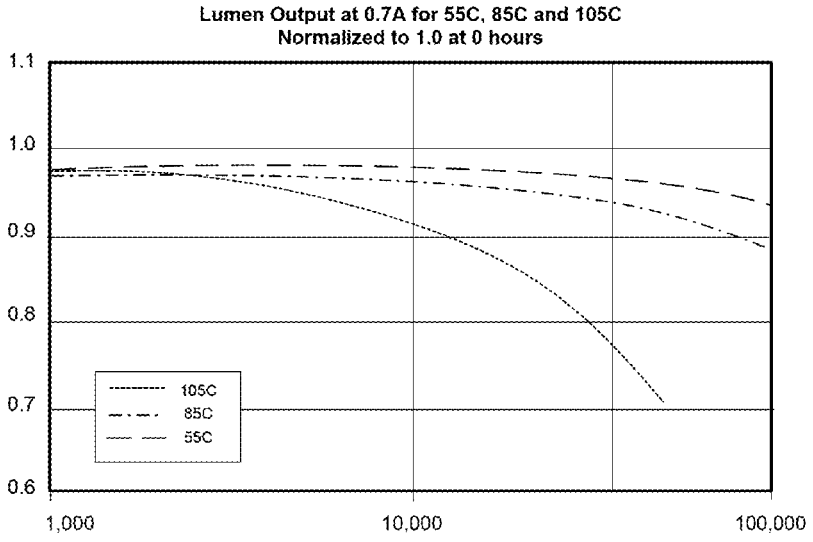
FIG. 2 is a graph illustrating how the lumen output of an exemplary emission LED changes over temperature and time for an exemplary fixed drive current of 0.7 A.
Figure 3:
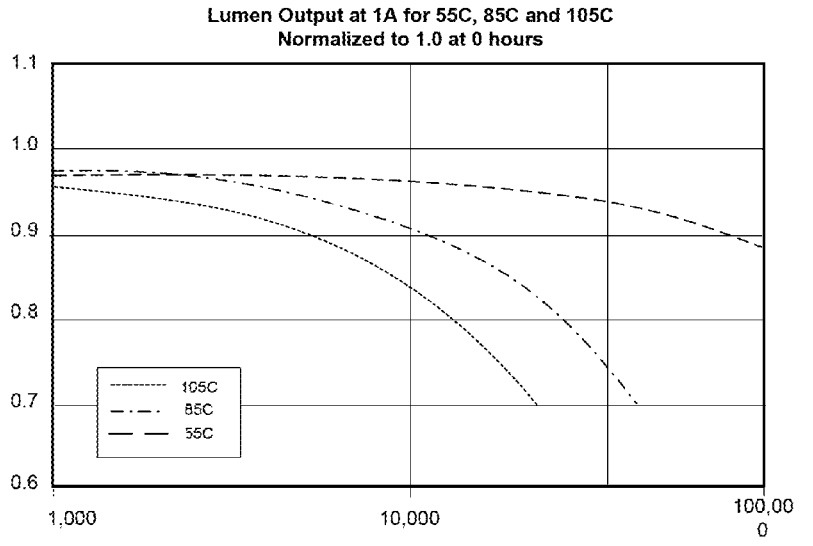
FIG. 3 is a graph illustrating how the lumen output of an exemplary emission LED changes over temperature and time for an exemplary fixed drive current of 1.0 A.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

An LED generally comprises a chip of semiconducting material doped with impurities to create a p-n junction. As in other diodes, current flows easily from the p-side, or anode, to the n-side, or cathode, but not in the reverse direction. Charge-carriers—electrons and holes—flow into the junction from electrodes with different voltages. When an electron meets a hole, it falls into a lower energy level, and releases energy in the form of a photon (i.e., light). The wavelength of the light emitted by the LED, and thus its color, depends on the band gap energy of the materials forming the p-n junction of the LED.

Red and yellow LEDs are commonly composed of materials (e.g., AlInGaP) having a relatively low band gap energy, and thus produce longer wavelengths of light. For example, most red and yellow LEDs have a peak wavelength in the range of approximately 610-650 nm and approximately 580-600 nm, respectively. On the other hand, green and blue LEDs are commonly composed of materials (e.g., GaN or InGaN) having a larger band gap energy, and thus, produce shorter wavelengths of light. For example, most green and blue LEDs have a peak wavelength in the range of approximately 515-550 nm and approximately 450-490 nm, respectively.

In some cases, a "white" LED may be formed by covering or coating, e.g., a blue LED having a peak emission wavelength of about 450-490 nm with a phosphor (e.g., YAG), which down-converts the photons emitted by the blue LED to a lower energy level, or a longer peak emission wavelength, such as about 525 nm to about 600 nm. In some cases, such an LED may be configured to produce substantially white light having a correlated color temperature (CCT) of about 3000K. However, a skilled artisan would understand how different colors of LEDs and/or different phosphors may be used to produce a "white" LED with a potentially different CCT.

When two or more differently colored LEDs are combined within a single package, the spectral content of the individual LEDs are combined to produce blended light. In some cases, differently colored LEDs may be combined to produce white or near-white light within a wide gamut of color points or CCTs ranging from "warm white" (e.g., roughly 2600K-3000K), to "neutral white" (e.g., 3000K-4000K) to "cool white" (e.g., 4000K-8300K). Examples of white light illumination devices include, but are not limited to, those that combine red, green and blue (RGB) LEDs, red, green, blue and yellow (RGBY) LEDs, white and red (WR) LEDs, and RGBW LEDs.

The present invention is generally directed to illumination devices having a plurality of light emitting diodes (LEDs) and one or more photodetectors. In some embodiments, the one or more photodetectors may comprise one or more dedicated photodetectors, which are configured solely for detecting light. In other embodiments, the one or more photodetectors may additionally or alternatively comprise one or more of the emission LEDs, which are configured only at certain times for detecting light. For the sake of simplicity, the term "LED" will be used throughout this disclosure to refer to a single LED, or a chain of serially connected LEDs supplied with the same drive current. According to one embodiment, the present invention provides improved methods for calibrating and compensating individual LEDs within an LED illumination device, so as to accurately maintain a desired luminous flux and a desired chromaticity for the illumination device over changes in drive current, temperature and time.

Although not limited to such, the present invention is particularly well suited to illumination devices (i.e., multi-colored illumination devices) in which two or more different colors of LEDs are combined to produce blended white or near-white light, since the output characteristics of differently colored LEDs vary differently over drive current, temperature and time. The present invention is also particularly well suited to illumination devices (i.e., tunable illumination devices) that enable the target dimming level and/or the target chromaticity setting to be changed by adjusting the drive currents supplied to one or more of the LEDs, since changes in drive current inherently affect the lumen output, color and temperature of the illumination device.

Figure 4:
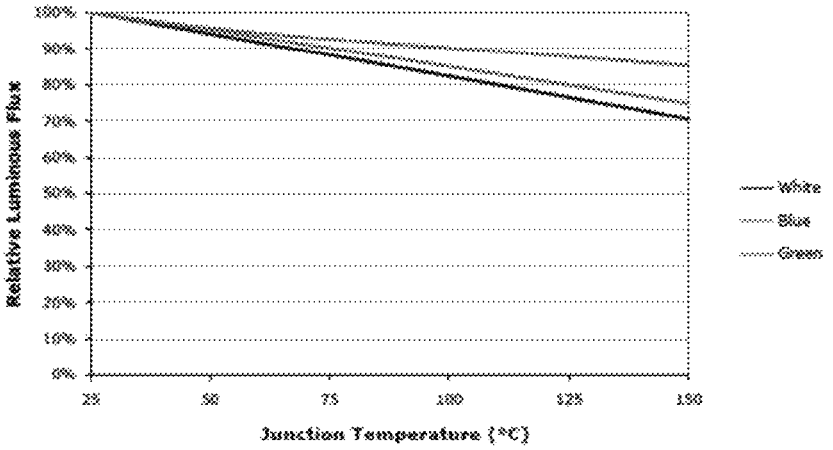
FIG. 4 is a graph illustrating the non-linear relationship between relative luminous flux and junction temperature for white, blue and green LEDs.
Figure 5:
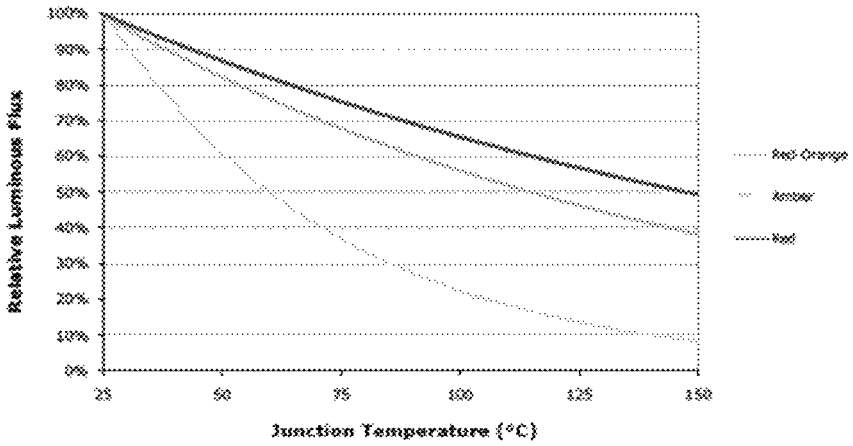
FIG. 5 is a graph illustrating the substantially more non-linear relationship between relative luminous flux and junction temperature for red, red-orange and yellow (amber) LEDs.

FIGS. 4-5 illustrate how the relative luminous flux of an individual LED changes over junction temperature for different colors of LEDs. As shown in FIGS. 4-5, the luminous flux output from all LEDs generally decreases with increasing temperature. For some colors (e.g., white, blue and green), the relationship between luminous flux and junction temperature is relatively linear (see FIG. 4), while for other colors (e.g., red, orange and especially yellow) the relationship is significantly non-linear (see, FIG. 5). The chromaticity of an LED also changes with temperature, due to shifts in the dominant wavelength (for both phosphor converted and non-phosphor converted LEDs) and changes in the phosphor efficiency (for phosphor converted LEDs). In general, the peak emission wavelength of green LEDs tends to decrease with increasing temperature, while the peak emission wavelength of red and blue LEDs tends to increase with increasing temperature. While the change in chromacity is relatively linear with temperature for most colors, red and yellow LEDs tend to exhibit a more significant non-linear change.

When differently colored LEDs are combined within a multi-colored illumination device, the color point of the resulting device often changes significantly with variations in temperature and over time. For example, when red, green and blue LEDs are combined within a white light illumination device, the color point of the device may appear increasingly "cooler" as the temperature rises. This is because the luminous flux produced by the red LEDs decreases significantly as temperatures increase, while the luminous flux produced by the green and blue LEDs remains relatively stable over temperature (see, FIGS. 4-5).

Furthermore, as LEDs age, the lumen output from both phosphor converted and non-phosphor converted LEDs, and the chromaticity of phosphor converted LEDs, also changes over time. Early on in life, the luminous flux can either increase (get brighter) or decrease (get dimmer), while late in life, the luminous flux generally decreases. As expected, the lumen output decreases faster over time when the LEDs are subjected to higher drive currents and higher temperatures. As a phosphor converted LED ages, the phosphor becomes less efficient and the amount of blue light that passes through the phosphor increases. This decrease in phosphor efficiency causes the overall color produced by the phosphor converted LED to appear "cooler" over time. Although the dominant wavelength and chromaticity of a non-phosphor converted LED does not change over time, the luminous flux decreases as the LED ages, which in effect causes the chromaticity of a multi-colored LED illumination device to change over time.

To account for temperature and aging effects, some prior art illumination devices attempt to maintain a consistent lumen output and/or a consistent chromaticity over temperature and time by measuring characteristics of the emission LEDs and increasing the drive current supplied to one or more of the emission LEDs. For example, some prior art illumination devices measure the temperature of the illumination device (either directly through an ambient temperature sensor or heat sink measurement, or indirectly through a forward voltage measurement), and adjust the drive currents supplied to one or more of the emission LEDs to account for temperature related changes in lumen output. Other prior art illumination devices measure the lumen output from individual emission LEDs, and if the measured value differs from a target value, the drive currents supplied to the emission LED are increased to account for changes in luminous flux that occur over time.

Figure 6:
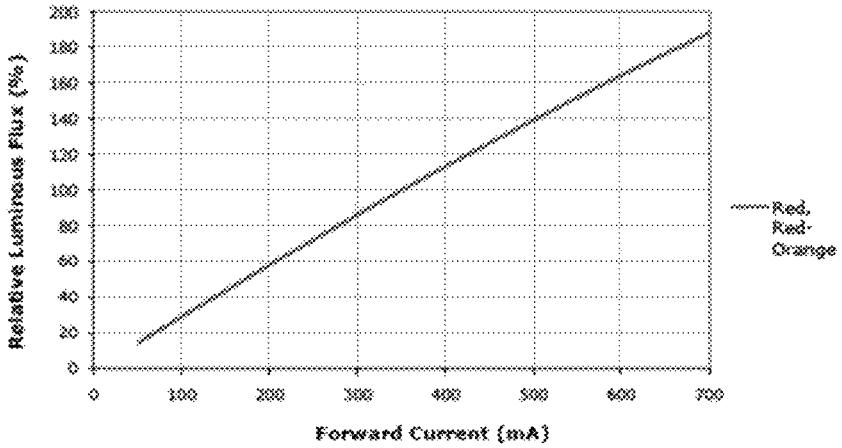
FIG. 6 is a graph illustrating the non-linear relationship between relative luminous flux and drive current for red and red-orange LEDs.
Figure 7:
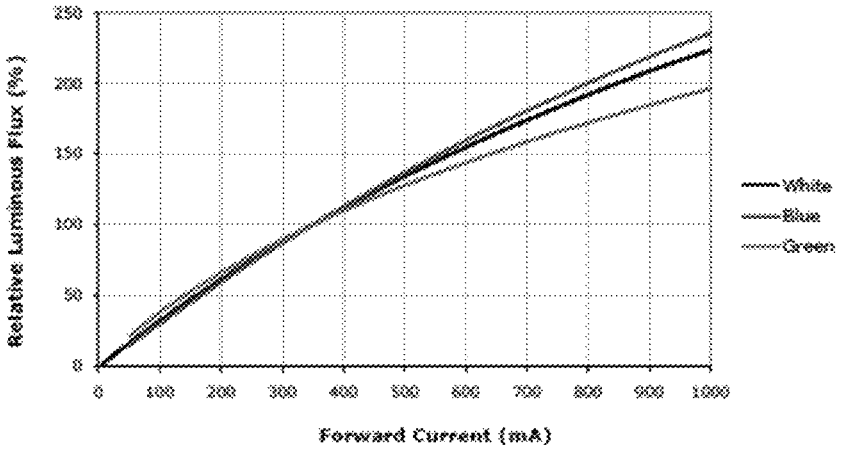
FIG. 7 is a graph illustrating the substantially more non-linear relationship between relative luminous flux and drive current for white, blue and green LEDs.

However, changing the drive currents supplied to the emission LEDs inherently affects the luminous flux and the chromaticity produced by the LED illumination device. FIGS. 6 and 7 illustrate the relationship between luminous flux and drive current for different colors of LEDs (e.g., red, red-orange, white, blue and green LEDs). In general, the luminous flux increases with larger drive currents, and decreases with smaller drive currents. However, the change in luminous flux with drive current is non-linear for all colors of LEDs, and this non-linear relationship is substantially more pronounced for certain colors of LEDs (e.g., blue and green LEDs) than others. The chromaticity of the illumination also changes when drive currents are increased to combat temperature and/or aging effects, since larger drive currents inherently result in higher LED junction temperatures (see, FIGS. 4-5). While the change in chromaticity with drive current/temperature is relatively linear for all colors of LEDs, the rate of change is different for different LED colors and even from part to part.

Although some prior art illumination devices may adjust the drive currents supplied to the emission LEDs, these devices fail to provide accurate temperature and age compensation by failing to account for the non-linear relationship that exists between luminous flux and junction temperature for certain colors of LEDs (FIGS. 4-5), the non-linear relationship that exists between luminous flux and drive current for all colors of LEDs (FIGS. 6-7), and the fact that these relationships differ for different colors of LEDs. These devices also fail to account for the fact that the rate of change in chromaticity with drive current/temperature is different for different colors of LEDs. Without accounting for these behaviors, prior art illumination devices cannot provide accurate temperature and age compensation for all LEDs included within a multi-colored LED illumination device.

Improved illumination devices and methods for calibrating and compensating individual LEDs included within such illumination devices are described in commonly assigned U.S. application Ser. Nos. 13/970,944; 13/970,964; and 13/970,990, which were filed on Aug. 20, 2013, and in commonly assigned U.S. application Ser. Nos. 14/314,451; 14/314,482; 14/314,530; 14/314,556; and 14/314,580, which were filed on Jun. 25, 2014. The entirety of these applications is incorporated herein by reference.

In these prior applications, various methods are described for precisely controlling the luminous flux and chromaticity of an LED illumination device over changes in temperature, drive current and over time, as the LEDs age. Temperature and drive current compensation is achieved, in some of the prior applications, by characterizing the relationships between luminous flux, chromaticity and emitter forward voltage over changes in drive current and ambient temperature, and storing such characterizations within a table of stored calibration values. Interpolation techniques (and other calculations) are subsequently performed to determine the drive currents that should be supplied to the individual emission LEDs to achieve a desired luminous flux (or a target luminance and/or chromaticity setting) based on a forward voltage presently measured across each individual emission LED.

In some of the prior applications, LED aging affects are additionally or alternatively accounted for by characterizing the photodetector forward voltages and the photocurrents, which are induced on the photodetector by the illumination individually produced by each emission LED over changes in drive current and ambient temperature. During operation, an expected photocurrent value is determined for each emission LED corresponding to the drive current presently applied to an emission LED and the forward voltage presently measured across the photodetector. Specifically, expected photocurrents are determined by applying interpolation technique(s) to a table of stored calibration values correlating forward voltage and photocurrent to drive current at a plurality of different temperatures. For each emission LED, the expected photocurrent is compared to a photocurrent measured across the photodetector at the drive current currently applied to the emission LED to determine if the currently applied drive current should be adjusted to counteract LED aging affects.

While the methods disclosed in the prior applications provide accurate control of luminous flux and chromaticity of an LED illumination device over changes in temperature, drive current and time, and also provide significant improvements and advantages over prior art illumination devices, the accuracy of the previously disclosed methods is somewhat dependent on temperature differences that may exist between the emission LEDs and the photodetector(s) included within the emitter module. U.S. application Ser. No. 14/314,482 provides one solution for maintaining a substantially fixed temperature difference between the emission LEDs and the photodetector(s), which increases the accuracy of the age compensation method disclosed in the prior applications. However, emitter modules that do not include the improvements set forth in U.S. application Ser. No. 14/314,482 are often unable to maintain a fixed temperature difference between the emission LEDs and photodetectors, and thus, cannot provide the same level of compensation accuracy.

Alternative methods are needed to account for LED aging affects in emitter modules that are unable to maintain a fixed temperature difference between the emission LEDs and photodetector(s). The present invention addresses such need by characterizing the emission LEDs and photodetector(s) separately, and by providing additional ways to characterize the emission LEDs and photodetector(s) over changes in drive current and temperature beyond the characterizations disclosed in the prior applications. These additional characterizations may be used in the calibration and compensation methods described herein to counteract the effects of LED aging, and may be especially useful in emitter module designs where the temperature between the emission LEDs and photodetectors is not well controlled. In some embodiments, the calibration and compensation methods described herein may be combined, or used along with, one or more of the calibration and compensation methods described in the prior applications to provide accurate control of the illumination device over changes in drive current and temperature, as well as time.

Exemplary Embodiments of Improved Methods for Calibrating an Illumination Device Wavelength and intensity are key characteristics of the emission LEDs, which are affected by drive current and emitter junction temperature. As noted above, the peak emission wavelength of green LEDs tends to decrease with increasing temperature/drive current, while the peak emission wavelength of red and blue LEDs tends to increase with increasing temperature/drive current. In order to fully characterize the emission LEDs, the wavelength and intensity (e.g., radiance or luminance) of the illumination produced by the individual emission LEDs should be carefully calibrated over a plurality of different drive currents and ambient temperatures.

In addition to emitter characteristics, the responsivity of the photodetector should be individually characterized for each emission LED. The photodetector responsivity can be defined as the ratio of the electrical output (e.g., photocurrent) of the photodetector over the optical input (e.g., radiance or luminance) to the photodetector. Since the responsivity of the photodetector necessarily changes with emitter wavelength and photodetector junction temperature, the photodetector can be effectively characterized for each emission LED by calculating the photodetector responsivity over changes in drive current (which affect emitter wavelength) and temperature. In preferred embodiments, the photodetector may be configured to operate at a relatively low current, so that aging of the photodetector is negligible over the lifetime of the illumination device. This allows the photodetector responsivities to be used as a reference for the emission LEDs during the compensation method described herein. Further description of the presently described calibration and compensation methods is set forth below.

Figure 8:
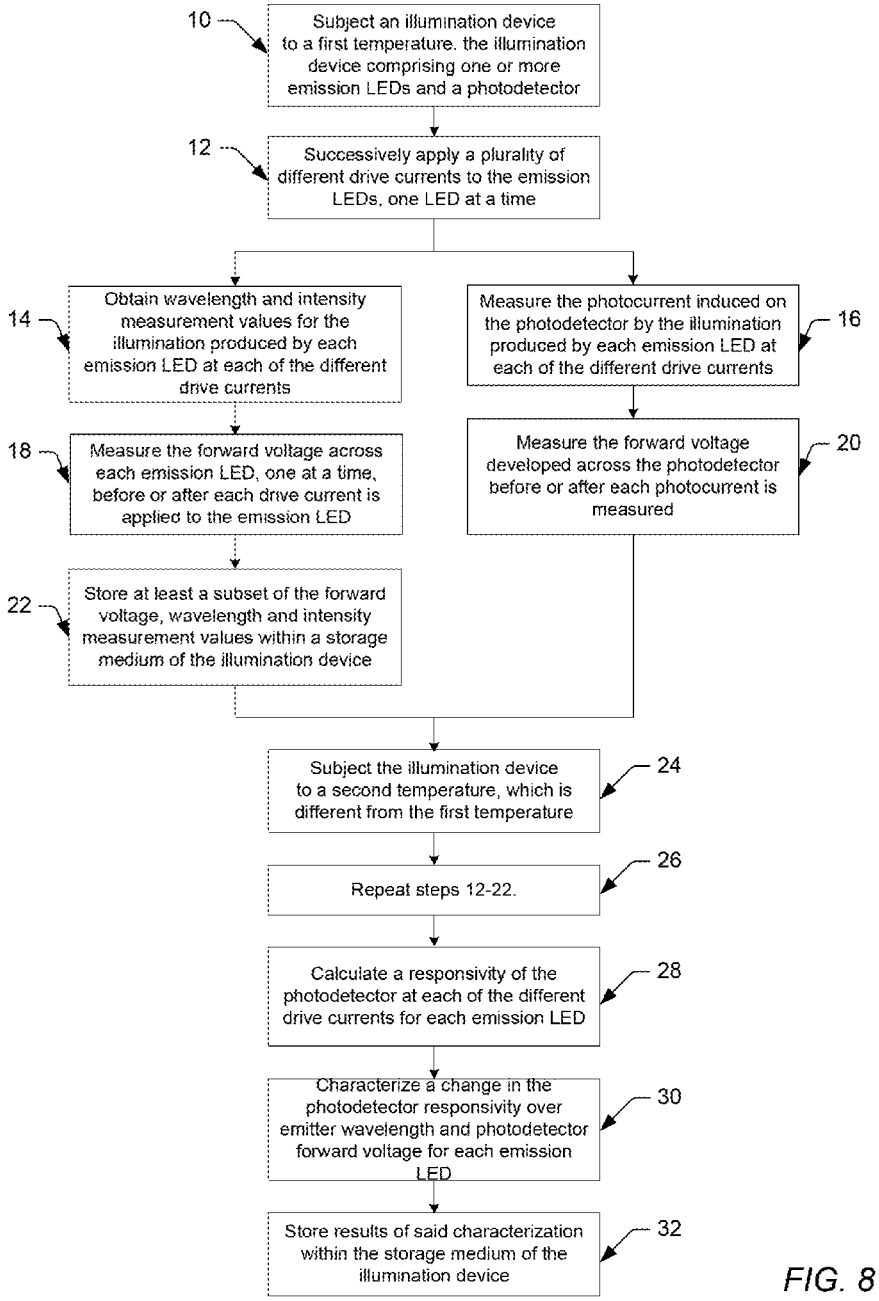
FIG. 8 is a flow chart diagram of an improved method for calibrating an illumination device comprising a plurality of LEDs and one or more photodetectors, in accordance with one embodiment of the invention.

FIG. 8 illustrates one embodiment of an improved method for calibrating an illumination device comprising a plurality of LEDs and at least one dedicated photodetector. In some embodiments, the calibration method shown in FIG. 8 may be used to calibrate an illumination device having LEDs all of the same color. However, the calibration method described herein is particularly well-suited for calibrating an illumination device comprising two or more differently colored LEDs (i.e., a multi-colored LED illumination device), since output characteristics of differently colored LEDs vary differently over time.

Exemplary embodiments of an improved illumination device will be described below with reference to FIGS. 17-19, which show various components of an exemplary LED illumination device, wherein the illumination device is assumed to have one or more emitter modules. In general, each emitter module may include a plurality of emission LEDs arranged in an array, and at least one dedicated photodetector spaced about a periphery of the array. In one exemplary embodiment, the array of emission LEDs may include red, green, blue and white (or yellow) LEDs, and the at least one dedicated photodetector may include one or more red, orange, yellow and/or green LEDs. In other exemplary embodiments, one or more of the emission LEDs may be configured at certain times to detect light from the other emission LEDs, and therefore, may be used in place of (or in addition to) the at least one dedicated photodetector. The present invention is not limited to any particular color, number, combination or arrangement of emission LEDs or photodetectors. Furthermore, while the present invention is particularly well-suited to emitter modules, which do not control the temperature difference between the emission LEDs and the photodetector(s), a skilled artisan would understand how the method steps described herein may be applied to other LED illumination devices having substantially any emitter module design.

As shown in FIG. 8, the improved calibration method may generally begin by subjecting the illumination device to a first ambient temperature (in step 10). Once subjected to this temperature, a plurality of different drive current levels may be applied to the emission LEDs (in step 12), one LED at a time. At each of the different drive current levels, wavelength and intensity measurement values may be obtained from the illumination produced by each of the emission LEDs (in step 14). In some embodiments, three or more different drive current levels (e.g., 100%, 30% and 10% of a max drive level) may be successively applied to each emission LED, one LED at a time, for the purpose of obtaining wavelength and intensity measurements from the emission LEDs. In at least one preferred embodiment, however, each emission LED is driven with about 10 to about 30 different drive currents selected over the operating current range of the emission LED, and the resulting wavelength and intensity are measured at each of these different drive currents.

Figure 9A:
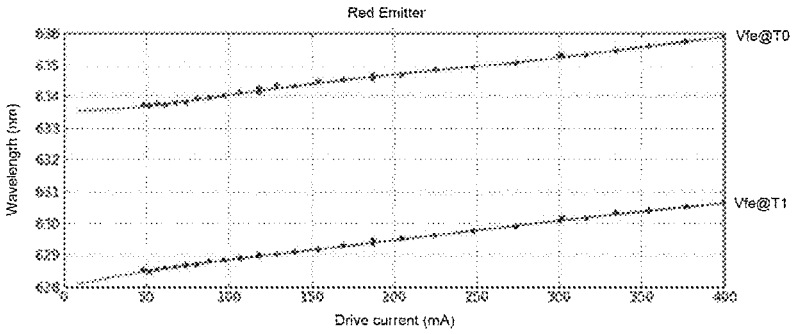
FIG. 9A is a graph illustrating a plurality of wavelength measurement values obtained from the illumination produced by a red emission LED at a plurality of different drive currents and a plurality of different temperatures.
Figure 9B:
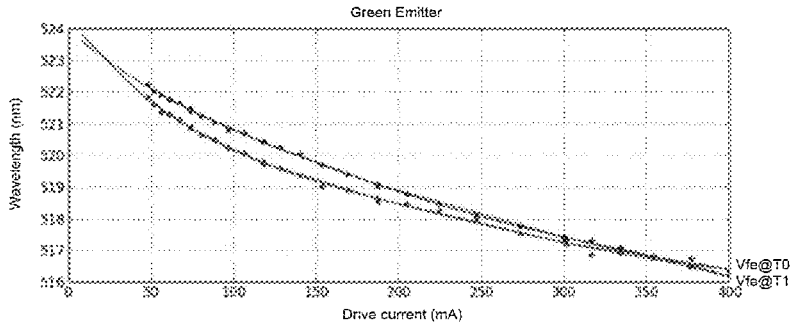
FIG. 9B is a graph illustrating a plurality of wavelength measurement values obtained from the illumination produced by a green emission LED at a plurality of different drive currents and a plurality of different temperatures.
Figure 9C:
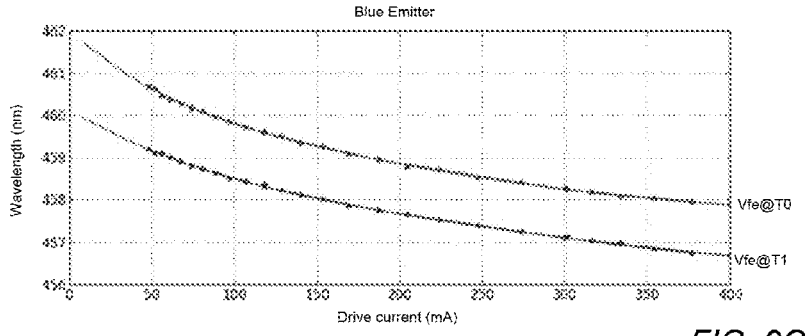
FIG. 9C is a graph illustrating a plurality of wavelength measurement values obtained from the illumination produced by a blue emission LED at a plurality of different drive currents and a plurality of different temperatures.

FIGS. 9A-9C are graphs illustrating a plurality of wavelength measurement values, which may be obtained from the illumination produced by the emission LEDs (i.e., a red LED in FIG. 9A, a green LED in FIG. 9B and a blue LED in FIG. 9C) at a plurality of different drive currents (e.g., 25 different drive currents) when the emission LEDs are subjected to a first ambient temperature (e.g., T0). In general, FIGS. 9A-9C show that the wavelength increases with increasing drive current for red LEDs, and decreases with increasing drive current for green and blue LEDs. FIGS. 9A-9C further show that, while the relationship between wavelength and drive current is substantially linear across the operating current range for red LEDs, green and blue LEDs exhibit a substantially more non-linear change. Obtaining wavelength measurement values at increasingly greater numbers of drive currents improves the accuracy of the calibration method by enabling green and blue LEDs to be more accurately characterized over the operating current range.

Figure 10A:
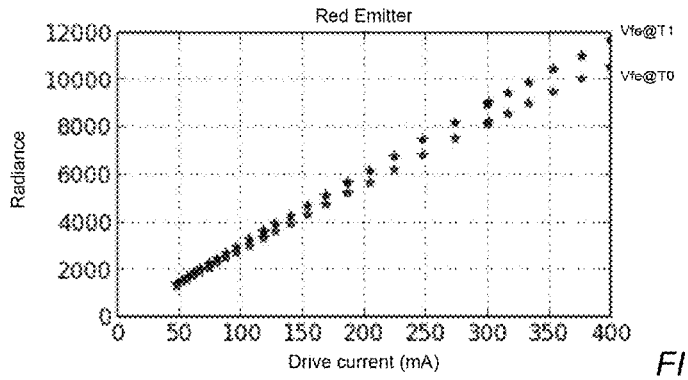
FIG. 10A is a graph illustrating a plurality of intensity (e.g., radiance) measurement values obtained from the illumination produced by a red emission LED at a plurality of different drive currents and a plurality of different temperatures.
Figure 10B:
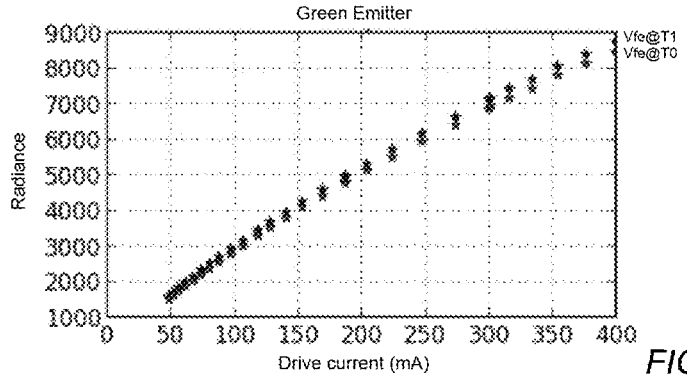
FIG. 10B is a graph illustrating a plurality of intensity (e.g., radiance) measurement values obtained from the illumination produced by a green emission LED at a plurality of different drive currents and a plurality of different temperatures.
Figure 10C:
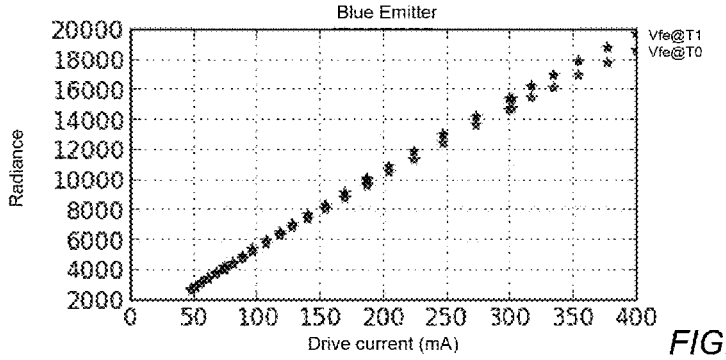
FIG. 10C is a graph illustrating a plurality of intensity (e.g., radiance) measurement values obtained from the illumination produced by a blue emission LED at a plurality of different drive currents and a plurality of different temperatures.

FIGS. 10A-10C are graphs illustrating a plurality of intensity measurement values, which may be obtained from the illumination produced by the emission LEDs (i.e., a red LED in FIG. 10A, a green LED in FIG. 10B and a blue LED in FIG. 10C) at a plurality of different drive currents (e.g., 25 different drive currents) when the emission LEDs are subjected to a first ambient temperature (e.g., T0). In one preferred embodiment, the intensity measurements are actually measurements of radiance, although luminance could be used in alternative embodiments. In general, FIGS. 10A-10C show that the radiance increases with increasing drive current for red, green and blue LEDs, however these figures also show that relationship between radiance and drive current is more linear for some LEDs (e.g., red LEDs), than others (e.g., green and blue LEDs). As before, obtaining intensity (i.e., radiance or luminance) measurement values at increasingly greater numbers of drive currents improves the accuracy of the calibration method by enabling green and blue LEDs to be more accurately characterized over the operating current range.

In general, the wavelength and intensity measurements may be obtained from the emission LEDs using an external calibration tool, such as a spectrophotometer. The measurement values obtained from the external calibration tool may be transmitted to the illumination device, as described in more detail below with respect to FIG. 17. In some embodiments, additional optical measurements may be obtained from the illumination produced by each emission LED at each of the different drive current levels. For example, the optical measurements may include a plurality of luminous flux and/or chromaticity measurements, which are obtained for each emission LED at a plurality of different drive current levels, as described in commonly assigned U.S. application Ser. Nos. 14/314,451; 14/314,482; 14/314,530; 14/314,556; and 14/314,580.

In addition to optical measurements, a plurality of electrical measurements may be obtained from each of the emission LEDs and each of the dedicated photodetector(s) at each of the different drive current levels. These electrical measurements may include, but are not limited to, photocurrents induced on the dedicated photodetector(s) and forward voltages measured across the dedicated photodetector(s) and the emission LEDs. Unlike the optical measurements described above, the electrical measurements may be obtained from the dedicated photodetector(s) and the emission LEDs using the LED driver and receiver circuit included within the illumination device. An exemplary embodiment of such a circuit is shown in FIGS. 17-18 and described in more detail below.

At each of the different drive currents levels, the LED driver and receiver circuit measures the photocurrents that are induced on the dedicated photodetector by the illumination individually produced by each emission LED (in step 16). In one embodiment, three or more photocurrent (Iph) measurements may be obtained from the dedicated photodetector for each emission LED when the emission LEDs are successively driven to produce illumination at three or more different drive current levels (e.g., 100%, 30% and 10% of a max drive level). In other embodiments, each emission LED may be driven with about 10 to about 30 different drive currents selected over the operating current range of the emission LED, and the resulting photocurrents may be measured across the photodetector at each of these different drive currents. In some embodiments, the LED driver and receiver circuit may obtain the photocurrent (Iph) measurements at substantially the same time the external calibration tool is measuring the wavelength and intensity measurements from the illumination produced by the emission LEDs at each of the different drive current levels.

In general, the drive currents applied to the emission LEDs to measure wavelength, intensity and induced photocurrent may be operative drive current levels (e.g., about 20 mA to about 500 mA). In some cases, increasingly greater drive current levels may be successively applied to each of the emission LEDs to obtain the measurements described herein. In other cases, the measurements may be obtained upon successively applying decreasing levels of drive current to the emission LEDs. The order in which the drive current levels are applied is largely unimportant, only that the drive currents be different from one another.

Although examples are provided herein, the present invention is not limited to any particular value or any particular number of drive current levels, and may apply substantially any value and any number of drive current levels to an emission LED within the operating current level range of that LED. However, it is generally desired to obtain the wavelength and intensity measurements from the emission LEDs and the photocurrent measurements from the photodetector at a sufficient number of different drive current levels, so that non-linear relationships between these measurements and drive current can be accurately characterized across the operating current range of the LED.

While increasing the number of measurements does improve the accuracy with which the non-linear relationships are characterized, it also increases calibration time and costs. While the increase in calibration time and cost may not be warranted in all cases, it may be beneficial in some. For example, additional wavelength and intensity measurements may be beneficial when attempting to characterize the wavelength vs. drive current relationship and the intensity vs. drive current relationship for certain colors of LEDs (e.g., blue and green LEDs), which tend to exhibit a significantly more non-linear relationship than other colors of LEDs (e.g., red LEDs; see, FIGS. 9A-9C and 10A-10C). Thus, a balance should be struck between accuracy and calibration time/costs when selecting a desired number of drive current levels with which to obtain measurements for a particular color of LED.

Since increasing drive currents affect the junction temperature of the emission LEDs, a forward voltage may be measured across each emission LED, one LED at a time, immediately before or after each operative drive current level is supplied to each emission LED (in step 18). In addition, a forward voltage can be measured across each photodetector (in step 20) before or after each photocurrent measurement is obtained (in step 16).

In one embodiment, a forward voltage (Vfe) measurement may be obtained from each emission LED (in step 18) and a forward voltage (Vfd) measurement may be obtained from each dedicated photodetector (in step 20) immediately before or after each of the different drive current levels is applied to the emission LED to measure the wavelength and intensity of the illumination produced by that emission LED at those drive current levels. The forward voltage (Vfe and Vfd) measurements can also be obtained before or after the induced photocurrents (Iph) are measured at each of the different drive current levels. By measuring the forward voltage (Vfe) developed across each emission LED and the forward voltage (Vfd) developed across each dedicated photodetector immediately before or after each operative drive current level is applied to the emission LEDs, the Vfe and Vfd measurements may be used to provide a good indication of how the junction temperature of the emission LEDs and the dedicated photodetector change with changes in drive current.

When taking forward voltage measurements, a relatively small drive current is supplied to each of the emission LEDs and each of the dedicated photodetector LEDs, one LED at a time, so that a forward voltage (Vfe or Vfd) developed across the anode and cathode of the individual LEDs can be measured (in steps 18 and 20). When taking these measurements, all other emission LEDs in the illumination device are preferably turned "off" to avoid inaccurate forward voltage measurements (since light from other emission LEDs would induce additional photocurrents in the LED being measured).

As used herein, a "relatively small drive current" may be broadly defined as a non-operative drive current, or a drive current level which is insufficient to produce significant illumination from the LED. Most LED device manufacturers, which use forward voltage measurements to compensate for temperature variations, supply a relatively large drive current to the LEDs (e.g., an operative drive current level sufficient to produce illumination from the LEDs) when taking forward voltage measurements. Unfortunately, forward voltages measured at operative drive current levels tend to vary significantly over the lifetime of an LED. As an LED ages, the parasitic resistance within the junction increases, which in turn, causes the forward voltage measured at operating current levels to increase over time, regardless of temperature. For this reason, a relatively small (i.e., non-operative) drive current is used herein when obtaining forward voltage measurements to limit the resistive portion of the forward voltage drop.

For some common types of emission LEDs with one square millimeter of junction area, the optimum drive current used herein to obtain forward voltage measurements from the emission LEDs may be roughly 0.1-10 mA, and more preferably may be about 0.3-3 mA. In one embodiment, the optimum drive current level may be about 1 mA for obtaining forward voltage measurements from the emission LEDs. However, smaller/larger LEDs may use proportionally less/more current to keep the current density roughly the same. In the embodiments that use a significantly smaller LED as the dedicated photodetector, the optimum drive current level for obtaining forward voltage measurements from a single photodetector may range between about 100 μA to about 300 μA. In one embodiment, the optimum drive current level used for obtaining forward voltage measurements from a plurality of dedicated photodetectors connected in parallel may be about 1 mA. The relatively small, non-operative drive currents used to obtain forward voltage measurements from the emission LEDs (e.g., about 0.3 mA to about 3 mA) and the relatively small, non-operative drive currents used to obtain forward voltage measurements from a dedicated photodetector (e.g., about 100 μA to about 300 μA) are substantially smaller than the operative drive current levels (e.g., about 20 mA to about 500 mA) used in steps 14 and 16 to measure wavelength, intensity and induced photocurrent.

After the measurements described in steps 14-20 are obtained at the first temperature, at least a subset of the wavelength, intensity and emitter forward voltage measurement values may be stored within the illumination device (in step 22), so that the stored calibration values can be later used to compensate the illumination device for changes in wavelength and intensity that may occur over variations in drive current, temperature and time. In one embodiment, the calibration values may be stored within a table of calibration values as shown, for example, in FIG. 12 and described in more detail below. The table of calibration values may be stored within a storage medium of the illumination device, as discussed below with reference to FIG. 17.

Once the optical and electrical measurement values are obtained for each emission LED at the plurality of different drive currents, the illumination device is subjected to a second ambient temperature, which is substantially different from the first ambient temperature (in step 24). Once subjected to this second temperature, steps 12-22 are repeated (in step 26) to obtain an additional plurality of optical measurements (e.g., a plurality of wavelength and intensity measurements) from each of the emission LEDs (in step 14), and an additional plurality of electrical measurements (e.g., emitter forward voltage, detector forward voltage and induced photocurrent) from the emission LEDs and the dedicated photodetector (in steps 16, 18 and 20). The additional measurements may be obtained at the second ambient temperature in the same manner described above for the first ambient temperature.

In one embodiment, the second ambient temperature may be substantially less than the first ambient temperature. For example, the second ambient temperature may be approximately equal to room temperature (e.g., roughly 25° C.), and the first ambient temperature may be substantially greater than room temperature. In one example, the first ambient temperature may be closer to an elevated temperature (e.g., roughly 70° C.) or a maximum temperature (e.g., roughly 85° C.) at which the device is expected to operate. In an alternative embodiment, the second ambient temperature may be substantially greater than the first ambient temperature.

It is worth noting that the exact values, number and order in which the temperatures are applied to calibrate the individual LEDs is somewhat unimportant. However, it is generally desired to obtain the wavelength and intensity calibration values at a number of different temperatures, so that the relationships between these measurements and drive current can be accurately characterized across the operating temperature range of each LED. In one preferred embodiment, the illumination device may be subjected to two substantially different ambient temperatures, which are selected from across the operating temperature range of the illumination device. While it is possible to obtain the measurements described herein at three (or more) temperatures, doing so may add significant expense, complexity and/or time to the calibration process. For this reason, it is generally preferred that the emission LEDs and the dedicated photodetector(s) be calibrated at only two different temperatures (e.g., about 25° C. and about 70° C.).

In some embodiments, the illumination device may be subjected to the first and second ambient temperatures by artificially generating the temperatures during the calibration process. However, it is generally preferred that the first and second ambient temperatures are ones which occur naturally during production of the illumination device, as this simplifies the calibration process and significantly decreases the costs associated therewith. In one embodiment, the measurements obtained at the elevated temperature may be taken after burn-in of the LEDs when the illumination device is relatively hot (e.g., roughly 50° C. to 85° C.), and sometime thereafter (e.g., at the end of the manufacturing line), a room temperature calibration may be performed to obtain measurements when the illumination device is relatively cool (e.g., roughly 20° C. to 30° C.).

FIG. 12 illustrates one embodiment of a calibration table that may be generated in accordance with the calibration method shown in FIG. 8. In the illustrated embodiment, the calibration table includes N*2 wavelength measurements (λ) and N*2 intensity measurements, which were obtained from each emission LED (e.g., LED1, LED2, and LED3) at a plurality (N) of different drive currents and the two different ambient temperatures (T0, T1). As noted above, a plurality of luminous flux and/or chromaticity measurements may also be obtained in some embodiments for each emission LED at the plurality of different drive current levels and the two different ambient temperatures (T0, T1). In such embodiments, the calibration table shown in FIG. 12 may also include N*2 luminous flux measurements and/or N*2 x and y chromaticity measurements from the illumination produced by each of the emission LEDs at the plurality (N) of different drive currents levels and the two different temperatures (T0, T1).

For each emission LED and each ambient temperature (T0, T1), the calibration table shown in FIG. 12 also includes the forward voltage (Vfe) that was measured across the emission LED and the forward voltage (Vfd) that was measured across the dedicated photodetector immediately before or after each of the different drive currents levels is supplied to the emission LEDs. In this example embodiment, N*2 Vfe measurements and N*2 Vfd measurements are stored for each emission LED, as shown in FIG. 12.

As noted above, some embodiments of the calibration method may store only a subset of the optical measurement values (e.g., wavelength, intensity, emitter forward voltage, and optionally, luminous flux and/or x, y chromaticity), which are obtained in steps 14 and 18 from the emission LEDs. For example, FIGS. 9A-9C and 10A-10C illustrate an embodiment in which wavelength and intensity (radiance) measurement values are obtained from each emission LED at 25 different drive currents for each ambient temperature. It may not be necessary, however, to store all 25 of these measurement values within the calibration table.

For example, it can be seen from FIGS. 9A and 10A that the relationships between wavelength, intensity and drive current are substantially linear for red LEDs. For red LEDs, it may only be necessary to store a subset (e.g., 3-7) of the wavelength and intensity measurement values obtained in step 14 within the calibration table to accurately characterize the substantially linear relationships between wavelength, intensity and drive current. On the other hand, the relationships between wavelength, intensity and drive current are substantially more non-linear for green and blue LEDs (see, FIGS. 9B-9C and 10B-10C). For these LEDs, the non-linear relationships may be more accurately characterized by storing a greater number (e.g., 5-15) of wavelength and intensity measurement values within the calibration table and/or by calculating and storing polynomial coefficient values along with each stored data point. For example, the calibration method may apply a second-order polynomial to a certain number (e.g., 3-7) of the wavelength and intensity measurement values obtained in step 14 to approximate a curvature of the line at those data points, and may store coefficients of the second-order polynomial within the calibration table along with each stored data point.

It is noted that while the wavelength, intensity and emitter forward voltage measurement values are stored within the calibration table (in step 22) for characterizing the emission LEDs over drive current and temperature, the induced photocurrent and detector forward voltages measured in steps 16 and 20 are not stored within the calibration table. Instead, the photodetector is characterized in the calibration method of FIG. 8 by calculating a photodetector responsivity value for each emission LED at each of the different drive currents and temperatures (in step 28). According to one embodiment, the photodetector responsivity values are calculated for each emission LED as a ratio of the photocurrent measured in step 16 over the intensity (e.g., radiance) measured in step 14 at each of the different drive currents and each of the ambient temperatures.

In step 30, the calibration method characterizes a change in the photodetector responsivity for each emission LED over emitter wavelength (λ) and photodetector forward voltage (Vfd). Specifically, for each emission LED, the calibration method generates relationships between the photodetector responsivity values calculated in step 28 and the emitter wavelengths and photodetector forward voltages measured in steps 14 and 20, respectively. The calibration method may then apply a first-order polynomial to the relationships generated for each emission LED to characterize the change in the photodetector responsivity over emitter wavelength and photodetector forward voltage. In step 32, the calibration method may store results of such characterizations within the storage medium of the illumination device to characterize the photodetector responsivity over wavelength and temperature separately for each emission LED.

Figure 11A:
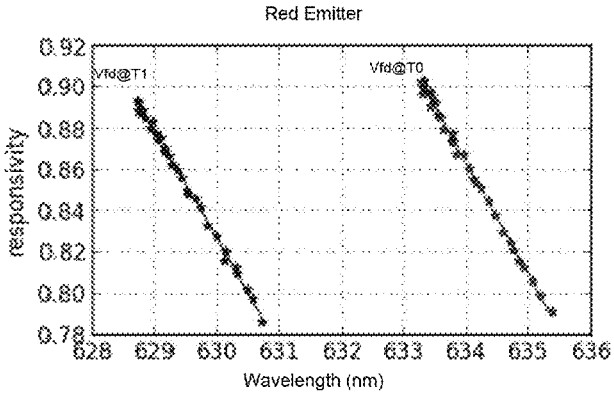
FIG. 11A is a graph illustrating exemplary changes in photodetector responsivity over red emission LED wavelength and photodetector forward voltage.
Figure 11B:
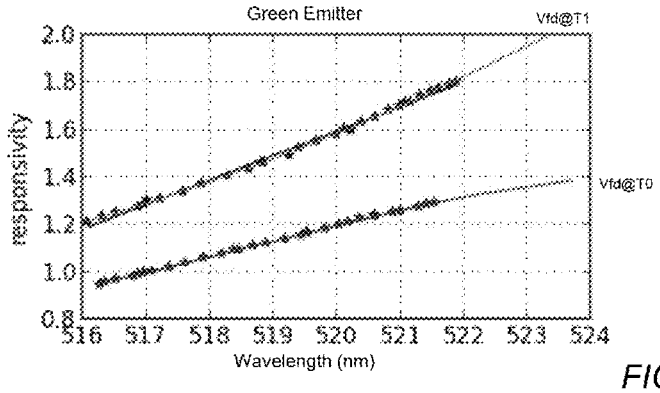
FIG. 11B is a graph illustrating exemplary changes in photodetector responsivity over green emission LED wavelength and photodetector forward voltage.
Figure 11C:
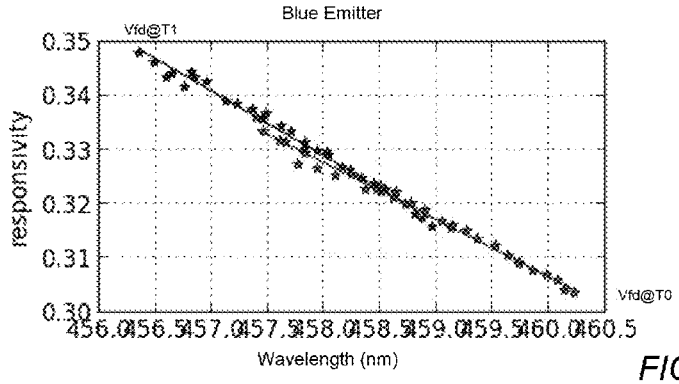
FIG. 11C is a graph illustrating exemplary changes in photodetector responsivity over blue emission LED wavelength and photodetector forward voltage.

FIGS. 11A-11C are graphs illustrating examples of the relationships that may be generated in step 30 of the calibration method to characterize the change in the photodetector responsivity for each emission LED (e.g., a red, green and blue LED) over emitter wavelength (λ) and photodetector forward voltage (Vfd). As shown in FIGS. 11A-11C the relationships between responsivity and wavelength are substantially linear, and thus, can be represented by a first-order polynomial.

According to one embodiment, the calibration method may apply a first-order polynomial of:

$$\text{Responsivity}=m*\lambda+b+d*Vfd \quad \text{EQ. 1}$$

to the relationships shown in FIGS. 11A-11C to characterize the change in the photodetector responsivity over emitter wavelength and photodetector forward voltage (in step 30). In this example, the coefficient 'm' corresponds to the slope of the lines shown in FIGS. 11A-11C, the coefficient 'b' corresponds to the offset or y-axis intercept value, and the coefficient 'd' corresponds to the shift due to temperature. In some cases, the slope of the lines may also vary over temperature. Thus, in accordance with another embodiment, the change in photodetector responsivity may be more accurately characterized by applying a first-order polynomial of:

$$\text{Responsivity}=(m+km)*\lambda+b+d*Vfd \quad \text{EQ. 2}$$

to the relationships shown in FIGS. 11A-11C, where the coefficient 'km' corresponds to a difference in the slope of the lines generated at T0 and T1. As shown in FIG. 12, the coefficient values in (and possibly kin), b and d may be stored within the calibration table in step 32 of the calibration method to characterize the photodetector responsivity over wavelength and temperature separately for each emission LED (e.g., LED1, LED2 and LED3).

The calibration table shown in FIG. 12 represents only one example of the calibration values that may be stored within an LED illumination device, in accordance with the calibration method described herein. In some embodiments, the calibration method shown in FIG. 8 may be used to store substantially different calibration values, or substantially different numbers of calibration values, within the calibration table of the LED illumination device. In some embodiments, the calibration table shown in FIG. 12 may also include additional columns for storing calibration values attributed to additional LEDs.

In one alternative embodiment of the invention, the calibration method shown in FIG. 8 may be used to obtain additional measurements, which may be later used to compensate for phosphor aging, and thereby, control the chromaticity of a phosphor converted white LED over time. For example, some embodiments of the invention may include a phosphor converted white emission LED within the emitter module. These LEDs may be formed by coating or covering, e.g., a blue LED having a peak emission wavelength of about 400-500 nm with a phosphor material (e.g., YAG) having a peak emission wavelength of about 500-650 nm to produce substantially white light with a CCT of about 3000K. Other combinations of LEDs and phosphors may be used to form a phosphor converted LED, which is capable of producing white or near-white light with a CCT in the range of about 2700K to about 10,000K.

In phosphor converted LEDs, the spectral content of the LED combines with the spectral content of the phosphor to produce white or near-white light. In general, the combined spectrum may include a first portion having a first peak emission wavelength (e.g., about 400-500), and a second portion having a second peak emission wavelength (e.g., about 500-650), which is substantially different from the first peak emission wavelength. In this example, the first portion of the spectrum is generated by the light emitted by the blue LED, and the second portion is generated by the light that passes through the phosphor (e.g., YAG).

As the phosphor converted LED ages, the efficiency of the phosphor decreases, which causes the chromaticity of the phosphor converted LED to appear "cooler" over time. In order to accurately characterize a phosphor converted LED, it may be desirable in some embodiments of the calibration method shown in FIG. 8 to characterize the LED portion and the phosphor portion of the phosphor converted LED separately. Thus, some embodiments of the invention may use two different colors of photodetectors to measure photocurrents, which are separately induced by different portions of the phosphor converted LED spectrum. In particular, an emitter module of the illumination device may include a first photodetector whose detection range is configured for detecting only the first portion of the spectrum emitted by the phosphor converted LED, and a second photodetector whose detection range is configured for detecting only the second portion of the spectrum emitted by the phosphor converted LED.

In general, the detection range of the first and second photodetectors may be selected based on the spectrum of the phosphor converted LED being measured. In the exemplary embodiment described above, in which a phosphor converted white emission LED is included within the emitter module and implemented as described above, the detection range of the first photodetector may range between about 400 nm and about 500 nm for measuring the photocurrents induced by light emitted by the blue LED portion, and the detection range of the second photodetector may range between about 500 nm and about 650 nm for measuring the photocurrents induced by light that passes through the phosphor portion of the phosphor converted white LED. The first and second photodetectors may include dedicated photodetectors and/or emission LEDs, which are configured at certain times for detecting incident light.

As noted above, the emitter module of the illumination device preferably includes at least one dedicated photodetector. In one embodiment, the emitter module may include two different colors of dedicated photodetectors, such as one or more dedicated green photodetectors and one or more dedicated red photodetectors. In another embodiment, the emitter module may include only one dedicated photodetector, such as a single red, orange or yellow photodetector. In such an embodiment, one of the emission LEDs (e.g., a green emission LED) may be configured, at times, as a photodetector for measuring a portion of the phosphor converted LED spectrum.

In the calibration method described above and shown in FIG. 8, a first photodetector may be used in step 16 to measure the photocurrents, which are induced in the first photodetector by the illumination produced by each of the emission LEDs when the emission LEDs are successively driven to produce illumination at the plurality of different drive current levels and the plurality of different temperatures. In some embodiments, the first photodetector may be, e.g., a red LED, and may be used to measure the photocurrent induced by the light that passes through the phosphor. Sometime before or after each of the photocurrent measurements is obtained from the first photodetector, a forward voltage is measured across the first photodetector to provide an indication of the detector junction temperature at each of the calibrated drive current levels.

In some embodiments, a second dedicated photodetector (or one of the emission LEDs) may be used to measure the photocurrent, which is induced by the light emitted by the LED portion of the phosphor converted white LED. This photodetector may be, for example, a dedicated green photodetector or one of the green emission LEDs. Sometime before or after each of the photocurrent measurements is obtained from the second photodetector, a forward voltage is measured across the second photodetector to provide an indication of the detector junction temperature at each of the calibrated drive current levels.

In addition to measuring separate photocurrent and detector forward voltages for the phosphor converted white LED, the calibration method may also obtain separate wavelength and intensity measurements (and optionally, separate luminous flux and/or x and y chromaticity measurements) for the LED portion and the phosphor portion of the phosphor converted white LED spectrum at each of the calibrated drive currents and temperatures. This would enable the calibration method to characterize the LED portion and the phosphor portion of the phosphor converted white LED, separately, as if the phosphor converted white LED were two different LEDs. It would also enable the calibration method to characterize the responsivity of the first and second photodetectors separately for the phosphor converted white LED (in steps 28-30).

Sometime after the wavelength and intensity measurement values are obtained for the LED and phosphor portions of the phosphor converted white LED (in step 14), and the photodetector responsivity coefficients are determined (in steps 28 and 30), the measurement values and coefficients may be stored within the calibration table. In some embodiments, the calibration table shown in FIG. 12 may correspond to an LED illumination device comprising two different colors of LEDs (e.g., a phosphor converted white LED and a red LED) within each emitter module. In such embodiments, two of the columns in the calibration table (e.g., LED1 and LED2) may be used to store the calibration values for the different spectral portions of the white LED, as if the white LED were two different LEDs. In other embodiments, the calibration table of FIG. 12 may correspond to an LED illumination device comprising three different colors of LEDs (e.g., red, green and blue LEDs) within the emitter module. If a phosphor converted white LED is also included within the emitter module, two additional columns may be added to the calibration table shown in FIG. 12 to accommodate the calibration values for the two distinct spectral portions of the phosphor converted LED.

Exemplary methods for calibrating an illumination device comprising a plurality of emission LEDs and one or more photodetectors has now been described with reference to FIGS. 8-12. Although the method steps shown in FIG. 8 are described as occurring in a particular order, one or more of the steps of the illustrated method may be performed in a substantially different order.

The calibration method provided herein improves upon conventional calibration methods in a number of ways. First, the method described herein calibrates each emission LED (or chain of LEDs) individually, while turning off all other emission LEDs not currently under test. This not only improves the accuracy of the stored calibration values, but also enables the stored calibration values to account for process variations between individual LEDs, as well as differences in output characteristics that inherently occur between different colors of LEDs.

Accuracy is further improved herein by supplying a relatively small (i.e., non-operative) drive current to the emission LEDs and the photodetector(s) when obtaining forward voltage measurements, as opposed to the operative drive current levels typically used in conventional calibration methods. By using non-operative drive currents to obtain the forward voltage measurements, the present invention avoids inaccurate compensation by ensuring that the forward voltage measurements for a given temperature and fixed drive current do not change significantly over time (due to parasitic resistances in the junction when operative drive currents are used to obtain forward voltage measurements).

As another advantage, the calibration method described herein obtains a plurality of optical measurements from each emission LED and a plurality of electrical measurements from each emission LED and photodetector at a plurality of different drive current levels and a plurality of different temperatures. This further improves calibration accuracy by enabling non-linear relationships between wavelength and drive current and non-linear relationships between intensity and drive current to be precisely characterized for certain colors of LEDs. Furthermore, obtaining the calibration values at a number of different ambient temperatures improves compensation accuracy by enabling the compensation method (described below) to interpolate between the stored calibration values, so that accurate compensation values may be determined for current operating temperatures.

As yet another advantage, the calibration method described herein may use different colors of photodetectors to measure photocurrents, which are induced by different portions (e.g., an LED portion and a phosphor portion) of a phosphor converted LED spectrum. By storing these calibration values separately within the illumination device, the calibration values can be used to characterize the LED portion and the phosphor portion of the phosphor converted LED, separately, as if the phosphor converted LED were two different LEDs. It also enables the calibration method to characterize the responsivity of the two different photodetectors separately for the phosphor converted LED.

As described in more detail below, the calibration values stored within the calibration table can be used in the compensation method described herein to adjust the individual drive currents supplied to the emission LEDs, so as to obtain a desired luminous flux and a desired chromaticity over time, as the LEDs age. In some embodiments, the calibration and compensation methods described herein may be combined, or used along with, one or more of the calibration and compensation methods described in commonly assigned U.S. application Ser. Nos. 14/314,451; 14/314,482; 14/314,530; 14/314,556; and 14/314,580 to provide accurate control of the illumination device over changes in drive current and temperature, as well as time. While the most accurate results may be obtained by utilizing all such methods when operating an LED illumination device, one skilled in the art would understand how the calibration and compensation methods specifically described herein may be used to improve upon the compensation methods performed by prior art illumination devices.

Exemplary Embodiments of Improved Methods for Controlling an Illumination Device FIGS. 13-16 illustrate an exemplary embodiment of an improved method for controlling an illumination device that generally includes a plurality of emission LEDs and at least one dedicated photodetector. More specifically, FIGS. 13-16 illustrate an exemplary embodiment of an improved compensation method that may be used to adjust the drive currents supplied to individual LEDs of an LED illumination device, so as to obtain a desired luminous flux and a desired chromaticity over time, as the LEDs age.

In some embodiments, the compensation methods shown in FIGS. 13-16 may be used to control an illumination device having LEDs all of the same color. However, the compensation method described herein is particularly well-suited for controlling an illumination device comprising two or more differently colored LEDs (i.e., a multi-colored LED illumination device), since output characteristics of differently colored LEDs vary differently over time.

Exemplary embodiments of an illumination device will be described below with reference to FIGS. 17-19, which show various components of an exemplary LED illumination device, where the illumination device is assumed to have one or more emitter modules. In general, each emitter module may include a plurality of emission LEDs arranged in an array, and one or more photodetectors spaced about a periphery of the array. In one exemplary embodiment, the array of emission LEDs may include red, green, blue and white (or yellow) LEDs, and the one or more photodetectors may include one or more red, orange, yellow and/or green LEDs. In other exemplary embodiments, one or more of the emission LEDs may be configured at certain times to detect light from at least some of the emission LEDs, and therefore, may be used in place of (or in addition to) the one or more of the dedicated photodetectors. The present invention is not limited to any particular color, number, combination or arrangement of emission LEDs and photodetectors. Furthermore, while the present invention is particularly well-suited to emitter modules, which do not control the temperature difference between the emission LEDs and the photodetector(s), a skilled artisan would understand how the method steps described herein may be applied to other LED illumination devices having substantially any emitter module design.

Figure 13:
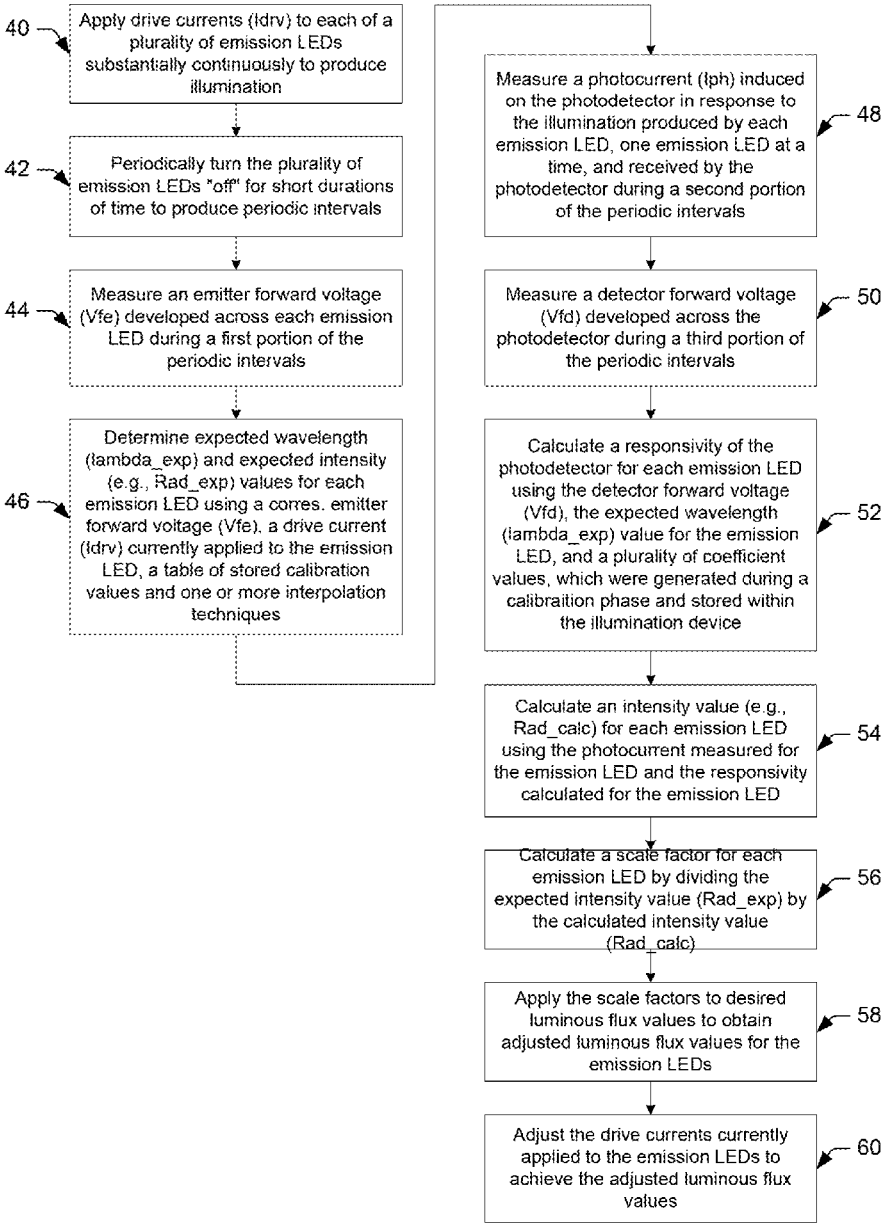
FIG. 13 is a flowchart diagram of an improved compensation method, in accordance with one embodiment of the invention.

In general, the compensation method shown in FIG. 13 may be performed repeatedly throughout the lifetime of the illumination device to account for LED aging effects. The method shown in FIG. 13 may be performed at substantially any time, such as when the illumination device is first turned "on," or at periodic or random intervals throughout the lifetime of the device. In some embodiments, the compensation method shown in FIG. 13 may be performed after a change in temperature, dimming level or color point setting is detected to fine tune the drive current values determined in one or more of the compensation methods disclosed in commonly assigned U.S. patent application Ser. Nos. 14/314,451; 14/314,482; 14/314,530; 14/314,556; and 14/314,580. This would provide accurate compensation for all LEDs used in the illumination device not only over time, but also over changes in drive current and temperature.

As shown in FIG. 13, the age compensation method may generally begin by driving the plurality of emission LEDs substantially continuously to produce illumination, e.g., by applying operative drive currents (Idrv) to each of the plurality of emission LEDs (in step 40). As noted above, the term "substantially continuously" means that an operative drive current is applied to the plurality of emission LEDs almost continuously, with the exception of periodic intervals during which the plurality of emission LEDs are momentarily turned off for short durations of time to produce periodic intervals (in step 42). In the method shown in FIG. 13, a first portion of the periodic intervals may be used for measuring a forward voltage (Vfe) presently developed across each emission LED, one LED at a time (in step 44). A second portion of the periodic intervals may be used for measuring a photocurrent, which is induced on the photodetector(s) in response to the illumination produced by each emission LED, one LED at a time, and received by the photodetector(s) (in step 48). A third portion of the periodic intervals may be used for measuring a forward voltage (Vfd) presently developed across the photodetector (in step 50). As in the calibration method, the Vfe and Vfd forward voltages are measured upon applying a relatively small (i.e., non-operative) drive current to the emission LEDs and the photodetector.

Figure 14:
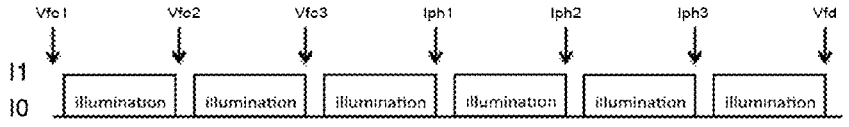
FIG. 14 is an exemplary timing diagram for an illumination device comprising three emission LEDs, illustrating the periodic intervals during which measurements (e.g., emitter forward voltage, photocurrent and photodetector forward voltage) are obtained from the emission LEDs and the photodetector.

FIG. 14 is an exemplary timing diagram illustrating steps 40, 42, 44, 48 and 50 of the compensation method shown in FIG. 13, according to one embodiment of the invention. As shown in FIGS. 13 and 14, the plurality of emission LEDS are driven substantially continuously with operative drive current levels (denoted generically as I1 in FIG. 14) to produce illumination (in step 40 of FIG. 13). At periodic intervals, the plurality of emission LEDs are turned "off" for short durations of time (in step 42 of FIG. 13) by removing the drive currents, or at least reducing the drive currents to non-operative levels (denoted generically as I0 in FIG. 14). Between the periodic intervals, the illumination device produces continuous illumination with DC current supplied to the emission LEDs.

During a first portion of the periodic intervals, one emission LED is driven with a relatively small, non-operative drive current level (e.g., approximately 0.1-0.3 mA), while the remaining LEDs remain "off," and the forward voltage (e.g., Vfe1) developed across that LED is measured. The forward voltages (e.g., Vfe1, Vfe 2, and Vfe 3) developed across each of the emission LEDs are measured, one LED at a time, as shown in FIG. 14 and step 44 of FIG. 13. These forward voltage measurements (also referred to herein as Vfe_present) provide an indication of the current junction temperature of the emission LEDs.

During a second portion of the periodic intervals, one emission LED is driven with an operative drive current level (II) to produce illumination, while the remaining LEDs remain "off," and the photocurrent (e.g., Iph1) induced in the photodetector by the illumination from the driven LED is measured. The photocurrents (e.g., Iph1, Iph2, and Iph3) induced in the photodetector by the illumination produced by each of the emission LEDs are measured, one LED at a time, as shown in FIG. 14 and step 48 of FIG. 13. Sometime before or after the photocurrent (Iph) measurements are obtained, a forward voltage (Vfd) is measured across the photodetector by applying a relatively small, non-operative drive current (e.g., approximately 0.1-0.3 mA) to the photodetector (in step 50 of FIG. 13) during a third portion of the periodic intervals. This forward voltage measurement (also referred to herein as Vfd_present) provides an indication of the current junction temperature of the photodetector.

FIG. 14 provides an exemplary timing diagram for an illumination device comprising three emission LEDs, such as RGB. However, one skilled in the art would understand how the timing diagram could be easily modified to accommodate a fewer or greater number of emission LEDs. It is further noted that, although the timing diagram of FIG. 14 shows only one forward voltage (Vfd) measurement obtained from a single photodetector, the timing diagram can be easily modified to accommodate a greater number of photodetectors.

In one exemplary embodiment, the presently described compensation method may be utilized within an illumination device comprising a plurality of photodetectors implemented with differently colored LEDs. In particular, each emitter module of the illumination device may include one or more red LEDs and one or more green LEDs as photodetectors. In such an embodiment, a forward voltage measurement (Vfd) may be obtained from each photodetector by applying a small drive current thereto (in step 50). In some cases, the photocurrents associated with each emission LED (e.g., Iph1, Iph2, and Iph3) and the forward voltage(s) associated with each photodetector (Vfd) may be independently averaged over a period of time, filtered to eliminate erroneous data, and stored for example in a register of the illumination device.

In addition to the photocurrents, emitter forward voltages and detector forward voltage(s), the periodic intervals shown in FIG. 14 may be used to obtain other measurements not specifically illustrated herein. For example, some periodic intervals may be used by the photodetector to detect light originating from outside of the illumination device, such as ambient light or light from other illumination devices. In some cases, ambient light measurements may be used to turn the illumination device on when the ambient light level drops below a threshold (i.e., when it gets dark), and turn the illumination device off when the ambient light level exceeds another threshold (i.e., when it gets light). In other cases, the ambient light measurements may be used to adjust the lumen output of the illumination device over changes in ambient light level, for example, to maintain a consistent level of brightness in a room. If periodic intervals are used to detect light from other illumination devices, the detected light may be used to avoid interference from the other illumination devices when obtaining the photocurrent and detector forward voltage measurements in the compensation method of FIG. 13.

In other embodiments, periodic intervals may be used to measure different portions of a particular LED's spectrum using two or more different colors of photodetectors. For example, the spectrum of a phosphor converted white LED may be divided into two portions, and each portion may be measured separately during two different periodic intervals using two different photodetectors. Specifically, a first periodic interval may be used to detect the photocurrent, which is induced on a first photodetector (e.g., a green photodetector) by a first spectral portion (e.g., about 400 nm to about 500 nm) of the phosphor converted white LED. A second periodic interval may then be used to detect the photocurrent, which is induced on a second photodetector (e.g., a red photodetector) by a second spectral portion (e.g., about 500 nm to about 650 nm) of the phosphor converted white LED.

Figure 15:
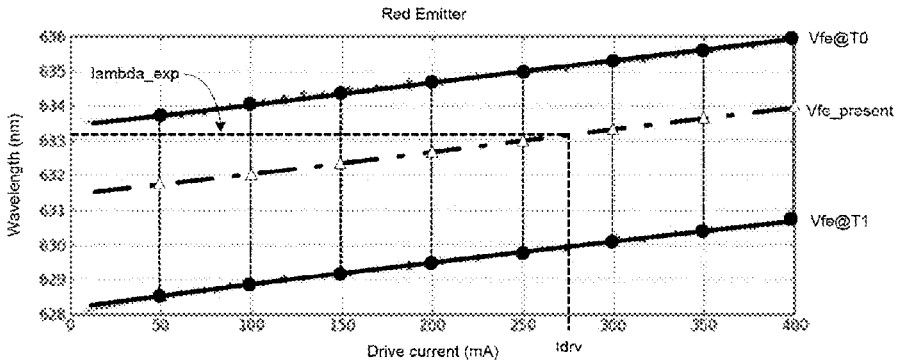
FIG. 15 is a graphical representation depicting how one or more interpolation technique(s) may be used in the compensation method of FIG. 13 to determine the expected wavelength for a given LED (e.g., a red emission LED) using the emitter forward voltage measured across the given LED, the drive current currently applied to the given LED, and the calibration values obtained during the calibration method of FIG. 8 and stored within the illumination device.
Figure 16:
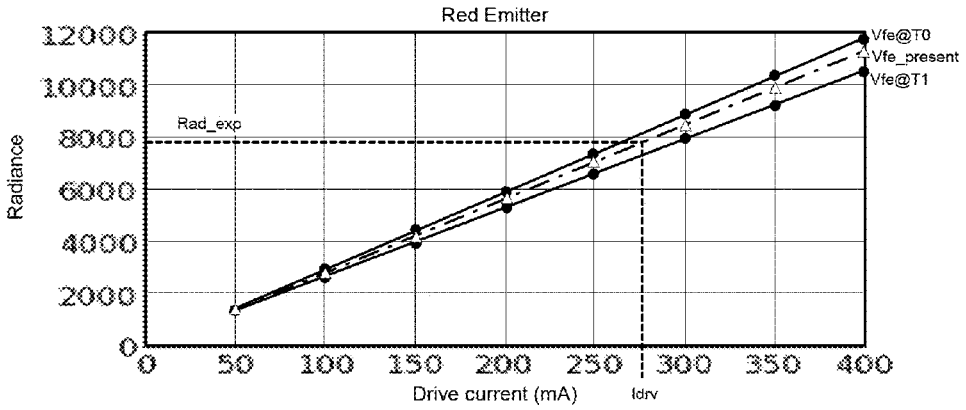
FIG. 16 is a graphical representation depicting how one or more interpolation technique(s) may be used in the compensation method of FIG. 13 to determine the expected intensity (e.g., radiance) for a given LED (e.g., a red emission LED) using the emitter forward voltage measured across the given LED, the drive current currently applied to the given LED, and the calibration values obtained during the calibration method of FIG. 8 and stored within the illumination device.

Sometime after the emitter forward voltage(s) are measured (in step 44), the compensation method shown in FIG. 13 may determine expected wavelength values (λ_exp) and expected intensity values (Rad_exp) for each emission LED (in step 46) using the forward voltage (Vfe_present) presently measured across the emission LED, the drive current (Idrv) presently applied to the emission LED, the table of stored calibration values generated during the calibration method of FIG. 8, and one or more interpolation techniques. FIGS. 15 and 16 illustrate how one or more interpolation techniques may be used to determine the expected wavelength values (λ_exp) and the expected intensity values (Rad_exp) for a given LED at the present operating temperature (Vfe_present) and the present drive current (Idrv) from the table of stored calibration values.

In FIG. 15, the solid dots (•) represent the wavelength calibration values, which were obtained during the calibration method of FIG. 8 at a plurality of different drive currents (e.g., 50 mA, 100 mA, 150 mA, 200 mA, 250 mA, 300 mA, 350 mA and 400 mA) and two different ambient temperatures (e.g., T0 and T1). The wavelength calibration values (•) were previously stored within a table of calibration values (see, e.g., FIG. 12) for each emission LED included within the illumination device. To determine the expected wavelength value (λ_exp) for a given LED, the compensation method of FIG. 13 interpolates between the stored calibration values (•) to calculate the wavelength values (Δ), which should be produced at the present operating temperature (Vfe_present) when using the same drive currents (e.g., 50 mA, 100 mA, 150 mA, 200 mA, 250 mA, 300 mA, 350 mA and 400 mA) that were used during calibration. In most cases, a linear interpolation technique can be used to calculate the wavelength values (Δ's) at the present operating temperature for all colors of LEDs. While this is illustrated for only a red LED, the same method may be used to calculate the wavelength values (Δ) that are expected to be produced at the present operating temperature and each of the calibrated drive currents for all colors of LEDs.

If the drive current (Idrv) presently supplied to the emission LED differs from one of the calibrated drive current levels, the compensation method of FIG. 13 may apply another interpolation technique to the calculated wavelength values (Δ) to generate a relationship there between (denoted by a dashed line in FIG. 15). In some cases, a linear interpolation or a non-linear interpolation of the calculated wavelength values (Δ) may be used to generate a linear relationship or a non-linear relationship between wavelength and drive current. As noted above and shown in FIGS. 9A-9C, the relationship between wavelength and drive current tends to be relatively linear for red LEDs, but significantly more non-linear for green and blue LEDs. In some cases, a linear interpolation may be selected to generate the relationship between the calculated wavelength values for red LEDs, while a non-linear interpolation is used for green and blue LEDs. In other cases, a piece-wise linear interpolation could be used to characterize the relationship between the calculated wavelength values for one or more of the LED colors. From each generated relationship, the expected wavelength value (λ_exp) may be determined for the drive current (Idrv) currently applied to the emission LED.

The expected intensity (e.g., Rad_exp) may be determined in substantially the same manner. For example, the solid dots (•) shown in FIG. 16 represent the intensity calibration values, which were obtained during the calibration method of FIG. 8 at a plurality of different drive currents (e.g., 50 mA, 100 mA, 150 mA, 200 mA, 250 mA, 300 mA, 350 mA and 400 mA) and two different ambient temperatures (e.g., T0 and T1). The wavelength calibration values (•) were previously stored within a table of calibration values (see, e.g., FIG. 12) for each emission LED included within the illumination device. Although FIG. 16 illustrates the use of radiance calibration values, some embodiments of the invention may instead utilize luminance.

To determine the expected intensity value (e.g., Rad_exp) for a given LED, the compensation method of FIG. 13 interpolates between the stored calibration values (•) to calculate the intensity values (Δ), which should be produced at the present operating temperature (Vfe_present) when using the same drive currents (e.g., 50 mA, 100 mA, 150 mA, 200 mA, 250 mA, 300 mA, 350 mA and 400 mA) that were used during calibration. In most cases, a linear interpolation technique can be used to calculate the intensity values (Δ) at the present operating temperature for all colors of LEDs. While this is illustrated for only a red LED, the same method may be used to calculate the intensity values (Δ) that are expected to be produced at the present operating temperature and each of the calibrated drive currents for all colors of LEDs.

If the drive current (Idrv) presently supplied to the emission LED differs from one of the calibrated drive current levels, the compensation method of FIG. 13 may apply another interpolation technique to the calculated intensity values (Δ) to generate a relationship there between (denoted by a dashed line in FIG. 16). In some cases, a linear interpolation or a non-linear interpolation of the calculated intensity values (Δ) may be used to generate a linear relationship or a non-linear relationship between intensity and drive current. As noted above and shown in FIGS. 10A-10C, the relationship between intensity and drive current tends to be relatively linear for red LEDs, but significantly more non-linear for green and blue LEDs. In some cases, a linear interpolation may be selected to generate the relationship between the calculated wavelength values for red LEDs, while a non-linear interpolation is used for green and blue LEDs. In other cases, a piece-wise linear interpolation could be used to characterize the relationship between the calculated intensity values for one or more of the LED colors. From each generated relationship, the expected intensity value (e.g., Rad_exp) may be determined for the drive current (Idrv) currently applied to the emission LED.

Sometime after the expected wavelength (λ_exp) value is determined for each emission LED (in step 46), the compensation method shown in FIG. 13 calculates a photodetector responsivity for each emission LED (in step 52) using the forward voltage (Vfd) measured across the photodetector in step 50, the expected wavelength value (λ_exp) determined for the emission LED in step 46 and a plurality of coefficient values, which were generated during the calibration method of FIG. 8 and stored within the illumination device to characterize a change in the photodetector responsivity over emitter wavelength and photodetector forward voltage.

As noted above, the photodetector responsivity may be expressed as a first-order polynomial in the form of:

$$\text{Responsivity}=m*\lambda+b+d*Vfd, \text{ or} \quad \text{EQ. 1}$$

$$\text{Responsivity}=(m+km)*\lambda+b+d*Vfd \quad \text{EQ. 2}$$

where the coefficient 'm' corresponds to the slope of the lines shown in FIGS. 11A-11C, the coefficient 'km' corresponds to a difference in the slope of the lines generated at T0 and T1, the coefficient 'b' corresponds to the offset or y-axis intercept value, and the coefficient 'd' corresponds to the shift due to temperature. These coefficient values were calculated and stored within the calibration table during the calibration phase to characterize the change in the photodetector responsivity over emitter wavelength and photodetector forward voltage for each emission LED. In step 52 of the compensation method shown in FIG. 13, the photodetector responsivity is again calculated for each emission LED at the present operating temperature by inserting the forward voltage (Vfd) presently measured across the photodetector in step 50, the expected wavelength value (λ_exp) determined for the emission LED in step 46 and the stored coefficient values (e.g., m, km, b, and d) within EQ. 1 or EQ. 2.

In step 54, an intensity value (e.g., Rad_calc) is calculated for each emission LED by dividing the photocurrent, which was induced in the photodetector from the illumination produced by the emission LED at the present drive current and measured in step 48, by the photodetector responsivity calculated in step 52 for that LED. Next, a scale factor is calculated for each emission LED (in step 56) by dividing the expected intensity value (e.g., Rad_exp) determined for the emission LED in step 46 by the intensity value (e.g., Rad_calc) calculated for the emission LED in step 54. Once the scale factor is calculated, the compensation method applies each scale factor to a desired luminous flux value for each emission LED to obtain an adjusted luminous flux value for each emission LED (in step 58). In some embodiments, the desired luminous flux values may be relative lumen values ($Y_1$, $Y_2$, $Y_3$ or $Y_4$), which are calculated during one of the compensation methods disclosed in the prior applications to account for changes in the target luminance (Ym) and/or target chromaticity (xm, ym) settings stored within the illumination device. Finally, the drive currents currently applied to the emission LEDs are adjusted (in step 60) to achieve the adjusted luminous flux values if a difference exists between the expected and calculated intensity values for any of the emission LEDs.

The compensation method described above and illustrated in FIG. 13 provides an accurate method for adjusting the individual drive currents applied to the emission LEDs, so as to compensate for the degradation in lumen output that occurs over time as the LEDs age. By accurately controlling the luminous flux produced by each emission LED, the compensation method accurately controls the color of an LED illumination device comprising a plurality of multicolored emission LEDs.

The compensation method shown in FIG. 13 and described above provides many advantages over conventional compensation methods. For example, the compensation method improves the accuracy with which emitter and detector forward voltage(s) are measured by applying a relatively small drive current (e.g., about 0.1 mA to about 0.3 mA) to the emission LEDs and photodetector(s). In addition, the compensation method interpolates between a plurality of stored wavelength and intensity values taken at different drive currents and different temperatures to derive relationships between wavelength, intensity and drive current for each emission LED at the present operating temperature (Vfe_present). By accurately and individually characterizing the wavelength vs. drive current relationship and the intensity vs. drive current relationship for each individual LED, the present compensation method is able to determine the wavelength and intensity, which would be expected from the emission LED at the present drive current and temperature, with a high degree of precision.

Furthermore, the compensation method described herein characterizes photodetector responsivity as a function of emitter wavelength and photodetector forward voltage separately for each emission LED. In preferred embodiments, a photodetector configured to operate at a relatively low current is used, so that aging of the photodetector is negligible over the lifetime of the illumination device. This allows the photodetector responsivity values calculated in step 52 to be used as a reference for the emission LEDs when the intensity values are calculated in step 54. The scale factors calculated in step 56 will account for any differences between the expected intensity (e.g., Rad_exp) and the calculated intensity (e.g., Rad_calc) at the drive current presently applied to an emission LED. If a difference exists, a scale factor>1 will be applied to the desired luminous flux value to increase the drive current applied to the emission LED, thereby increasing the lumen output.

Exemplary Embodiments of Improved Illumination Devices

The improved methods described herein for calibrating and controlling an illumination device may be used within substantially any LED illumination device having a plurality of emission LEDs and one or more photodetectors. As described in more detail below, the improved methods described herein may be implemented within an LED illumination device in the form of hardware, software or a combination of both.

Illumination devices, which benefit from the improved methods described herein, may have substantially any form factor including, but not limited to, parabolic lamps (e.g., PAR 20, 30 or 38), linear lamps, flood lights and mini-reflectors. In some cases, the illumination devices may be installed in a ceiling or wall of a building, and may be connected to an AC mains or some other AC power source. However, a skilled artisan would understand how the improved methods described herein may be used within other types of illumination devices powered by other power sources (e.g., batteries or solar energy).

Exemplary embodiments of an improved illumination device will now be described with reference to FIGS. 17-19, which show various components of an LED illumination device, where the illumination device is assumed to have one or more emitter modules. Each emitter module included within the LED illumination device may generally include a plurality of emission LEDs and at least one dedicated photodetector, all of which are mounted onto a common substrate and encapsulated within a primary optics structure. Although examples are provided herein, the inventive concepts described herein are not limited to any particular type of LED illumination device, any particular number of emitter modules that may be included within an LED illumination device, or any particular number, color or arrangement of emission LEDs and photodetectors that may be included within an emitter module. Instead, the present invention may only require an LED illumination device to include at least one emitter module comprising a plurality of emission LEDs and at least one dedicated photodetector. In some embodiments, a dedicated photodetector may not be required, if one or more of the emission LEDs is configured, at times, to provide such functionality. While the present invention is particularly well-suited to emitter modules, which do not control the temperature difference between the emission LEDs and the photodetector(s), a skilled artisan would understand how the method steps described herein may be applied to other types of LED illumination devices having substantially different emitter module designs.

Figure 17:
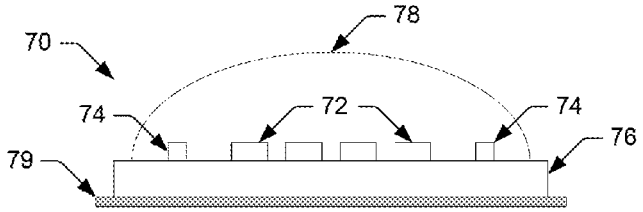
FIG. 17 is a side view of an exemplary emitter module.

One embodiment of an exemplary emitter module 70 that may be included within an LED illumination device is shown in FIG. 17. In the illustrated embodiment, emitter module 70 includes four emission LEDs 72, which are mounted onto a substrate 76 and encapsulated within a primary optics structure 78. The primary optics structure 78 may be formed from a variety of different materials and may have substantially any shape and/or dimensions necessary to shape the light emitted by the emission LEDs in a desirable manner. Although the primary optics structure is described below as a dome, one skilled in the art would understand how the primary optics structure may have substantially any other shape or configuration, which encapsulates the emission LEDs and the at least one photodetector. In some embodiments, a heat sink 79 may be coupled to a bottom surface of the substrate 76 for drawing heat away from the heat generating components of the emitter module. In other embodiments, the heat sink 79 may be omitted.

In some embodiments, the emission LEDs 72 may be arranged in a square array and placed as close as possible together in the center of the dome 78, so as to approximate a centrally located point source. In some embodiments, the emission LEDs 72 may each be configured for producing illumination at a different peak emission wavelength. For example, the emission LEDs 72 may include RGBW LEDs or RGBY LEDs. In some embodiments, the array of emission LEDs 72 may include a chain of four red LEDs, a chain of four green LEDs, a chain of four blue LEDs, and a chain of four white or yellow LEDs. Each chain of LEDs may be coupled in series and driven with the same drive current. In some embodiments, the individual LEDs in each chain may be scattered about the array, and arranged so that no color appears twice in any row, column or diagonal, to improve color mixing within the emitter module 70.

In addition to the emission LEDs 72, one or more dedicated photodetectors 74 may be mounted onto the substrate 76 and arranged within the dome 78 somewhere around the periphery of the array. The dedicated photodetector(s) 74 may be any device (such as a silicon photodiode or an LED) that produces current indicative of incident light. In one embodiment, at least one of the dedicated photodetectors 74 is an LED with a peak emission wavelength in the range of approximately 550 nm to 700 nm. A photodetector with such a peak emission wavelength will not produce photocurrent in response to infrared light, which reduces interference from ambient light sources. The at least one photodetector 74 is preferably implemented with a small red, orange or yellow LED. Such a photodetector may be configured to operate at a relatively low current, so that aging of the at least one photodetector is negligible over the lifetime of the illumination device. In some embodiments, the at least one photodetector 74 may be arranged to capture a maximum amount light, which is reflected from a surface of the dome 78 from the emission LEDs having the shortest wavelengths (e.g., the blue and green emission LEDs).

In some embodiments, four dedicated photodetectors 74 may be included within the dome 78 and arranged around the periphery of the array. In some embodiments, the four dedicated photodetectors 74 may be placed close to, and in the middle of, each edge of the array and may be connected in parallel to a receiver of the illumination device. By connecting the four dedicated photodetectors 74 in parallel with the receiver, the photocurrents induced on each photodetector may be summed to minimize the spatial variation between the similarly colored LEDs, which may be scattered about the array.

The emitter module shown in FIG. 17 is provided merely as an example of an emitter module that may be included in an LED illumination device. Further description of the emitter module may be found in commonly assigned U.S. application Ser. No. 14/097,339 and commonly assigned U.S. Application No. 61/886,471, which incorporated herein by reference in their entirety.

One problem with emitter modules, such as the one shown in FIG. 17, is that the temperature difference between the emission LEDs 72 and the photodetector(s) 74 is typically not well controlled. In particular, the junction temperature of the emission LEDs 72 tends to be about 10-20° C. higher than the junction temperature of the smaller, less frequently used photodetectors 74. Furthermore, because LED junction temperatures fluctuate with drive current, the temperature difference ($\Delta T$) between the emission LEDs and the photodetectors tends to change with operating conditions.

The presently described calibration method address this problem by precisely characterizing how the wavelength and intensity of the emission LEDs changes over drive current and temperature, and precisely characterizing how the responsivity of the photodetector changes over emitter wavelength and detector forward voltage for each emission LED. During operation of the illumination device, the compensation method described herein calculates the responsivity, which is to be expected from the photodetector for the drive currently presently applied to the emission LED and the current junction temperature of the photodetector. Although the photodetector responsivity necessarily changes with emitter wavelength and detector junction temperature, it will not change significantly over time if a relatively small photodetector is used and driven with a relatively low current, This allows the compensation method described herein to use the photodetector responsivity as a reference when determining the difference between the intensity expected from the emission LED and the current intensity output by the emission LED. If a difference exists, a scale factor is generated to increase the lumen output from the emission LED to counteract LED aging affects.

Figure 18:
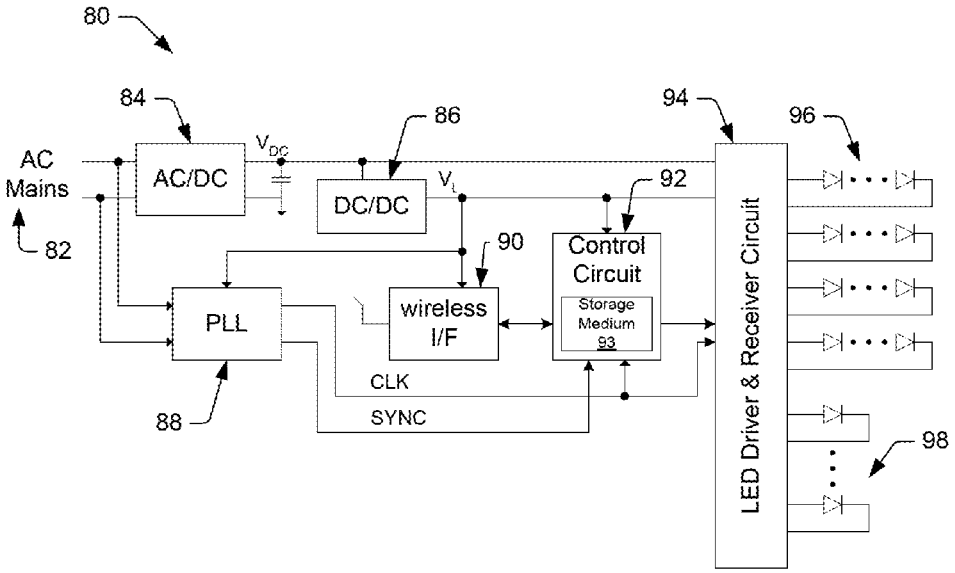
FIG. 18 is an exemplary block diagram of circuit components that may be included within an illumination device, according to one embodiment of the invention.

FIG. 18 is one example of a block diagram of an illumination device 80, which is configured to accurately maintain a desired luminous flux and a desired chromaticity over variations in drive current, temperature and time. The illumination device illustrated in FIG. 18 provides one example of the hardware and/or software that may be used to implement the calibration method shown in FIG. 8 and the compensation method shown in FIG. 13.

In the illustrated embodiment, illumination device 80 comprises a plurality of emission LEDs 96 and one or more dedicated photodetectors 98. In this example, the emission LEDs 96 comprise four chains of any number of LEDs. In typical embodiments, each chain may have 2 to 4 LEDs of the same color, which are coupled in series and configured to receive the same drive current. In one example, the emission LEDs 96 may include a chain of red LEDs, a chain of green LEDs, a chain of blue LEDs, and a chain of white or yellow LEDs. However, the present invention is not limited to any particular number of LED chains, any particular number of LEDs within the chains, or any particular color or combination of LED colors.

Although the one or more dedicated photodetectors 98 are also illustrated in FIG. 18 as including a chain of LEDs, the present invention is not limited to any particular type, number, color, combination or arrangement of photodetectors. In one embodiment, the one or more dedicated photodetectors 98 may include a small red, orange or yellow LED. In another embodiment, the one or more dedicated photodetectors 98 may include one or more small red LEDs and one or more small green LEDs. In some embodiments, one or more of the dedicated photodetector(s) 98 shown in FIG. 18 may be omitted if one or more of the emission LEDs 96 are configured, at times, to function as a photodetector. The plurality of emission LEDs 96 and the (optional) dedicated photodetectors 98 may be included within an emitter module, as discussed above. In some embodiments, an illumination device may include more than one emitter module, as discussed above.

In addition to including one or more emitter modules, illumination device 80 includes various hardware and software components, which are configured for powering the illumination device and controlling the light output from the emitter module(s). In one embodiment, the illumination device is connected to AC mains 82, and includes AC/DC converter 84 for converting AC mains power (e.g., 120V or 240V) to a DC voltage ($V_{DC}$). As shown in FIG. 18, this DC voltage (e.g., 15V) is supplied to the LED driver and receiver circuit 94 for producing the operative drive currents, which are applied to the emission LEDs 96 for producing illumination. In addition to the AC/DC converter, a DC/DC converter 86 is included for converting the DC voltage $V_{DC}$ (e.g., 15V) to a lower voltage $V_L$ (e.g., 3.3V), which may be used to power the low voltage circuitry included within the illumination device, such as PLL 88, wireless interface 90, and control circuit 92.

In the illustrated embodiment, PLL 88 locks to the AC mains frequency (e.g., 50 or 60 HZ) and produces a high speed clock (CLK) signal and a synchronization signal (SYNC). The CLK signal provides the timing for control circuit 92 and LED driver and receiver circuit 94. In one example, the CLK signal frequency is in the tens of megahertz range (e.g., 23 MHz), and is precisely synchronized to the AC Mains frequency and phase. The SNYC signal is used by the control circuit 92 to create the timing used to obtain the various optical and electrical measurements described above. In one example, the SNYC signal frequency is equal to the AC Mains frequency (e.g., 50 or 60 HZ) and also has a precise phase alignment with the AC Mains.

In some embodiments, a wireless interface 90 may be included and used to calibrate the illumination device 80 during manufacturing. As noted above, for example, an external calibration tool (not shown in FIG. 18) may communicate wavelength and intensity (and optionally, luminous flux and chromaticity) calibration values to an illumination device under test via the wireless interface 90. The calibration values received via the wireless interface 90 may be stored in the table of calibration values within a storage medium 93 of the control circuit 92, for example.

Wireless interface 90 is not limited to receiving only calibration data, and may be used for communicating information and commands for many other purposes. For example, wireless interface 90 could be used during normal operation to communicate commands, which may be used to control the illumination device 80, or to obtain information about the illumination device 80. For instance, commands may be communicated to the illumination device 80 via the wireless interface 90 to turn the illumination device on/off, to control the dimming level and/or color set point of the illumination device, to initiate the calibration procedure, or to store calibration results in memory. In other examples, wireless interface 90 may be used to obtain status information or fault condition codes associated with illumination device 80.

In some embodiments, wireless interface 90 could operate according to ZigBee, WiFi, Bluetooth, or any other proprietary or standard wireless data communication protocol. In other embodiments, wireless interface 90 could communicate using radio frequency (RF), infrared (IR) light or visible light. In alternative embodiments, a wired interface could be used, in place of the wireless interface 90 shown, to communicate information, data and/or commands over the AC mains or a dedicated conductor or set of conductors.

Using the timing signals received from PLL 88, the control circuit 92 calculates and produces values indicating the desired drive current to be used for each LED chain 96. This information may be communicated from the control circuit 92 to the LED driver and receiver circuit 94 over a serial bus conforming to a standard, such as SPI or $I^2C$, for example. In addition, the control circuit 92 may provide a latching signal that instructs the LED driver and receiver circuit 94 to simultaneously change the drive currents supplied to each of the LEDs 96 to prevent brightness and color artifacts.

During calibration, the control circuit 92 may be configured for generating a plurality of photodetector responsivity coefficients (e.g., m, km, b, and d) for each of the emission LEDs, which may then be stored within the storage medium 93. In some embodiments, the control circuit 92 may determine the photodetector responsivity coefficients by executing program instructions stored within the storage medium 93. During operation of the illumination device, the control circuit 92 may be further configured for determining the respective drive currents needed to achieve a desired luminous flux and/or a desired chromaticity for the illumination device in accordance with the compensation method shown in FIG. 8 13. In some embodiments, the control circuit 92 may determine the respective drive currents by executing additional program instructions stored within the storage medium 93. In one embodiment, the storage medium 93 may be a non-volatile memory, and may be configured for storing the program instructions used by the control circuit during the calibration and compensation methods along with a table of calibration values, such as the table described above with respect to FIG. 12.

In general, the LED driver and receiver circuit 94 may include a number (N) of driver blocks equal to the number of emission LED chains 96 included within the illumination device. In the exemplary embodiment discussed herein, LED driver and receiver circuit 94 comprises four driver blocks 100, each configured to produce illumination from a different one of the emission LED chains 96. The LED driver and receiver circuit 94 also comprises the circuitry needed to measure ambient temperature (optional), the detector and/or emitter forward voltages, and the detector photocurrents, and to adjust the LED drive currents accordingly. Each driver block receives data indicating a desired drive current from the control circuit 92, along with a latching signal indicating when the driver block should change the drive current.

Figure 19:
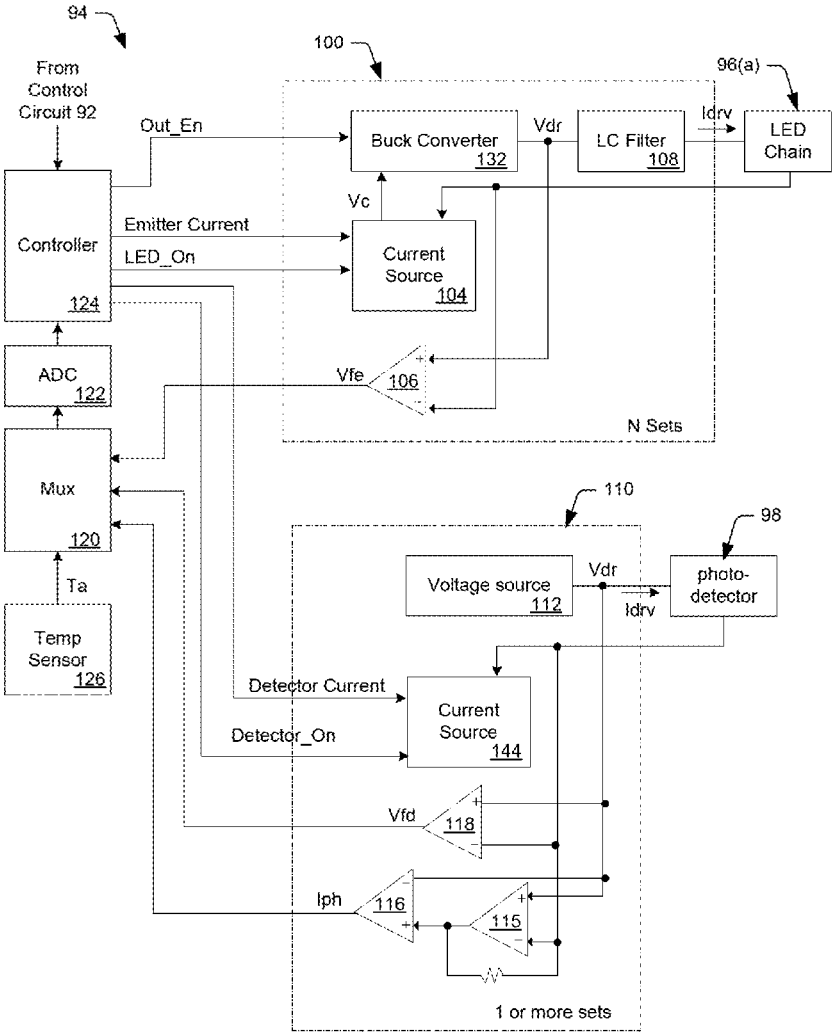
FIG. 19 is an exemplary block diagram of an LED driver and receiver circuit that may be included within the illumination device of FIG. 18, according to one embodiment of the invention.

FIG. 19 is an exemplary block diagram of an LED driver and receiver circuit 94, according to one embodiment of the invention. As shown in FIG. 19, the LED driver and receiver circuit 94 includes four driver blocks 100, each block including a buck converter 102, a current source 104, and an LC filter 108 for generating the drive currents that are supplied to a connected chain of emission LED 96a to produce illumination and obtain forward voltage (Vfe) measurements. In some embodiments, buck converter 102 may produce a pulse width modulated (PWM) voltage output (Vdr) when the controller 124 drives the "Out_En" signal high. This voltage signal (Vdr) is filtered by the LC filter 108 to produce a forward voltage on the anode of the connected LED chain 96a. The cathode of the LED chain is connected to the current source 104, which forces a fixed drive current equal to the value provided by the "Emitter Current" signal through the LED chain 96a when the "Led_On" signal is high. The "Vc" signal from the current source 104 provides feedback to the buck converter 102 to output the proper duty cycle and minimize the voltage drop across the current source 104.

As shown in FIG. 19, each driver block 100 includes a difference amplifier 106 for measuring the forward voltage drop (Vfe) across the chain of emission LEDs 96a. When measuring Vfe, the buck converter 102 is turned off and the current source 104 is configured for drawing a relatively small drive current (e.g., about 1 mA) through the connected chain of emission LEDs 96a. The voltage drop (Vfe) produced across the LED chain 96a by that current is measured by the difference amplifier 106. The difference amplifier 106 produces a signal that is equal to the forward voltage (Vfe) drop across the emission LED chain 96a during forward voltage measurements.

In addition to including a plurality of driver blocks 100, the LED driver and receiver circuit 94 may include one or more receiver blocks 110 for measuring the forward voltages (Vfd) and photocurrents (Iph) induced across the one or more dedicated photodetectors 98. Although only one receiver block 110 is shown in FIG. 19, the LED driver and receiver circuit 94 may generally include a number of receiver blocks 110 equal to the number of dedicated photodetectors included within the emitter module.

In the illustrated embodiment, receiver block 110 comprises a voltage source 112, which is coupled for supplying a DC voltage (Vdr) to the anode of the dedicated photodetector 98 coupled to the receiver block, while the cathode of the photodetector 98 is connected to current source 114. When photodetector 98 is configured for obtaining a forward voltage (Vfd) measurement, the controller 124 supplies a "Detector_On" signal to the current source 114, which forces a fixed drive current (Idrv) equal to the value provided by the "Detector Current" signal through photodetector 98.

When obtaining detector forward voltage (Vfd) measurements, current source 114 is configured for drawing a relatively small amount of drive current (Idrv) through photodetector 98. The voltage drop (Vfd) produced across photodetector 98 by that current is measured by difference amplifier 118, which produces a signal equal to the forward voltage (Vfd) drop across photodetector 98. As noted above, the drive current (Idrv) forced through photodetector 98 by the current source 114 is generally a relatively small, non-operative drive current. In the embodiment in which four dedicated photodetectors 98 are coupled in parallel, the non-operative drive current may be roughly 1 mA. However, smaller/larger drive currents may be used in embodiments that include fewer/greater numbers of photodetectors, or embodiments that do not connect the photodetectors in parallel.

In addition to measuring forward voltage, receiver block 110 also includes circuitry for measuring the photocurrents (Iph) induced on photodetector 98 by light emitted by the emission LEDs. As shown in FIG. 19, the positive terminal of transimpedance amplifier 115 is coupled to the Vdr output of voltage source 112, while the negative terminal is connected to the cathode of photodetector 98. When connected in this manner, the transimpedance amplifier 115 produces an output voltage relative to Vdr (e.g., about 0-1V), which is supplied to the positive terminal of difference amplifier 116. Difference amplifier 116 compares the output voltage to Vdr and generates a difference signal, which corresponds to the photocurrent (Iph) induced across photodetector 98. Transimpedance amplifier 115 is enabled when the "Detector_On" signal is low. When the "Detector_On" signal is high, the output of transimpedance amplifier 115 is tri-stated.

As noted above, some embodiments of the invention may scatter the individual LEDs within each chain of LEDs 96 about the array of LEDs, so that no two LEDs of the same color exist in any row, column or diagonal. By connecting a plurality of dedicated photodetectors 98 in parallel with the receiver block 110, the photocurrents (Iph) induced on each photodetector 98 by the LEDs of a given color may be summed to minimize the spatial variation between the similarly colored LEDs, which are scattered about the array.

As shown in FIG. 19, the LED driver and receiver circuit 94 may also include a multiplexor (Mux) 120, an analog to digital converter (ADC) 122, a controller 124, and an optional temperature sensor 126. In some embodiments, multiplexor 120 may be coupled for receiving the emitter forward voltage (Vfe) from the driver blocks 100, and the detector forward voltage (Vfd) and detector photocurrent (Iph) measurements from the receiver block 110. The ADC 122 digitizes the Vfe, Vfd and Iph measurements and provides the results to the controller 124. The controller 124 determines when to take forward voltage and photocurrent measurements and produces the "Out_En," "Emitter Current" and "Led_On" signals, which are supplied to the driver blocks 100, and the "Detector Current" and "Detector_On" signals, which are supplied to the receiver block 110 as shown in FIG. 19.

In some embodiments, the LED driver and receiver circuit 94 may include an optional temperature sensor 126 for taking ambient temperature (Ta) measurements. In such embodiments, multiplexor 120 may also be coupled for multiplexing the ambient temperature (Ta) with the forward voltage and photocurrent measurements sent to the ADC 122. In some embodiments, the temperature sensor 126 may be a thermistor, and may be included on the driver circuit chip for measuring the ambient temperature surrounding the LEDs, or a temperature from the heat sink of the emitter module. In other embodiments, the temperature sensor 126 may be an LED, which is used as both a temperature sensor and an optical sensor to measure ambient light conditions or output characteristics of the LED emission chains 96.

One implementation of an improved illumination device 80 has now been described in reference to FIGS. 17-19. Further description of such an illumination device may be found in commonly assigned U.S. application Ser. Nos. 13/970,944; 13/970,964; and 13/970,990 and commonly assigned U.S. application Ser. Nos. 14/314,451; 14/314,482; 14/314,530; 14/314,556; and 14/314,580. A skilled artisan would understand how the illumination device could be alternatively implemented within the scope of the present invention.

It will be appreciated to those skilled in the art having the benefit of this disclosure that this invention is believed to provide an improved illumination device and improved methods for calibrating and compensating individual LEDs in the illumination device, so as to maintain a desired luminous flux and a desired chromaticity over time. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

What is claimed is:

1. A method for controlling an illumination device comprising a plurality of emission light emitting diodes (LEDs) and a photodetector, wherein the method comprises:

applying respective drive currents to the plurality of emission LEDs to drive the plurality of emission LEDs substantially continuously to produce illumination;

periodically turning the plurality of emission LEDs off for short durations of time to produce periodic intervals;

measuring a forward voltage presently developed across each emission LED, one LED at a time, during a first portion of the periodic intervals; and determining, for each emission LED, an expected wavelength value and an expected intensity value corresponding to the forward voltage measured across the emission LED and the drive current currently applied to the emission LED by applying one or more interpolation techniques to a table of stored calibration values correlating wavelength and intensity to drive current at a plurality of different temperatures.

2. The method as recited in claim 1, wherein for each emission LED, the table of stored calibration values comprises:

a first plurality of stored wavelength values, which were previously detected from the emission LED upon applying a plurality of different drive currents to the emission LED during a calibration phase when the emission LED was subjected to a first ambient temperature;

a second plurality of stored wavelength values, which were previously detected from the emission LED upon applying the plurality of different drive currents to the emission LED during the calibration phase when the emission LED was subjected to a second temperature, which is different than the first ambient temperature;

a first plurality of stored forward voltages, which were previously measured across the emission LED before or after each of the different drive currents was applied to the emission LED during the calibration phase when the emission LED was subjected to the first ambient temperature; and a second plurality of stored forward voltages, which were previously measured across the emission LED before or after each of the different drive currents was applied to the emission LED during the calibration phase when the emission LED was subjected *to* the second temperature.

3. The method as recited in claim 2, wherein the step of determining an expected wavelength value for each emission LED comprises:

calculating a third plurality of wavelength values corresponding to the forward voltage presently measured across the emission LED by interpolating between the first plurality of stored wavelength values and the second plurality of wavelength values corresponding to the emission LED;

generating a relationship between the third plurality of wavelength values; and selecting the expected wavelength value from the generated relationship that corresponds to the drive current currently applied to the emission LED.

4. The method as recited in claim 3, wherein the step of calculating the third plurality of wavelength values comprises using a linear interpolation technique to interpolate between the first and second plurality of stored wavelength values corresponding to the emission LED.

5. The method as recited in claim 3, wherein the step of generating the relationship comprises applying a linear interpolation or a non-linear interpolation to the third plurality of wavelength values to generate a linear relationship or a non-linear relationship between wavelength and drive current for the emission LED, wherein application of the linear interpolation or the non-linear interpolation is based on a color of the emission LED.

6. The method as recited in claim 3, wherein the step of generating the relationship comprises applying a piece-wise linear interpolation to the third plurality of wavelength values to approximate a non-linear relationship between wavelength and drive current for the emission LED.

7. The method as recited in claim [1] *2*, wherein for each emission LED, the table of stored calibration values further comprises:

a first plurality of stored intensity values, which were previously detected from the emission LED upon applying the plurality of different drive currents to the emission LED during the calibration phase when the emission LED was subjected to the first ambient temperature; and a second plurality of stored intensity values, which were previously detected from the emission LED upon applying the plurality of different drive currents to the emission LED during the calibration phase when the emission LED was subjected to the second ambient temperature.

8. The method as recited in claim 7, wherein the step of determining an expected intensity value for each emission LED comprises:

calculating a third plurality of intensity values corresponding to the forward voltage presently measured across the emission LED by interpolating between the first plurality of stored intensity values and the second plurality of intensity values corresponding to the emission LED;

generating a relationship between the third plurality of intensity values; and selecting the expected intensity value from the generated relationship that corresponds to the drive current currently applied to the emission LED.

9. The method as recited in claim 8, wherein the step of calculating the third plurality of intensity values comprises using a linear interpolation technique to interpolate between the first and second plurality of stored intensity values corresponding to the emission LED.

10. The method as recited in claim 8, wherein the step of generating the relationship comprises applying a linear interpolation to the third plurality of intensity values to generate a linear relationship between intensity and drive current for the emission LED.

11. The method as recited in claim 8, wherein the step of generating the relationship comprises applying a piece-wise linear interpolation to the third plurality of intensity values to approximate a non-linear relationship between intensity and drive current for the emission LED.

12. The method as recited in claim 8, wherein the first, second and third plurality of intensity values comprise radiance values, and wherein the expected intensity value is an expected radiance value.

13. The method as recited in claim 8, wherein the first, second and third plurality of intensity values comprise luminance values, and wherein the expected intensity value is an expected luminance value.

14. The method as recited in claim 1, further comprising:

measuring a photocurrent induced on the photodetector in response to the illumination produced by each emission LED, one emission LED at a time, and received by the photodetector during a second portion of the periodic intervals;

measuring a forward voltage presently developed across the photodetector by applying a non-operative drive current to the photodetector during a third portion of the periodic intervals; and calculating, for each emission LED, a responsivity of the photodetector using the expected wavelength value determined for the emission LED, the forward voltage presently measured across the photodetector, and a plurality of coefficient values that were generated during a calibration phase and stored within the illumination device to characterize a change in the photodetector responsivity over emitter wavelength and photodetector forward voltage.

15. The method as recited in claim 14, wherein for each emission LED, the method further comprises:

calculating an intensity value for the emission LED by dividing the induced photocurrent measured during the measuring step by the photodetector responsivity calculated during the calculating step;

calculating a scale factor by dividing the expected intensity value determined for the emission LED by the intensity value calculated for the emission LED;

applying the scale factor to a desired luminous flux value for the emission LED to obtain an adjusted luminous flux value for the emission LED; and adjusting the drive current currently applied to the emission LED to achieve the adjusted luminous flux value.

16. An illumination device, comprising:

a plurality of emission light emitting diodes (LEDs);

a storage medium configured for storing a table of calibration values correlating wavelength and intensity to drive current at a plurality of different temperatures for each of the plurality of emission LEDs;

an LED driver and receiver circuit configured for applying respective drive currents to the plurality of emission LEDs to drive the plurality of emission LEDs substantially continuously to produce illumination, periodically turning the plurality of emission LEDs off for short durations of time to produce periodic intervals, and applying a non-operative drive current to each emission LED, one LED at a time, during the a first portion of the periodic intervals to measure a forward voltage presently developed across each emission LED; and a control circuit configured for determining, for each emission LED, an expected wavelength value and an expected intensity value corresponding to the forward voltage presently measured across the emission LED and the drive current currently applied to the emission LED by applying one or more interpolation techniques to the table of stored calibration values.

17. The illumination device as recited in claim 16, wherein for each emission LED, the table of stored calibration values comprises:

a first plurality of stored wavelength values, which were previously detected from the emission LED upon applying a plurality of different drive currents to the emission LED during a calibration phase when the emission LED was subjected to a first ambient temperature;

a second plurality of stored wavelength values, which were previously detected from the emission LED upon applying the plurality of different drive currents to the emission LED during the calibration phase when the emission LED was subjected to a second temperature, which is different than the first ambient temperature;

a first plurality of stored forward voltages, which were previously measured across the emission LED before or after each of the different drive currents was applied to the emission LED during the calibration phase when the emission LED was subjected to the first ambient temperature; and a second plurality of stored forward voltages, which were previously measured across the emission LED before or after each of the different drive currents was applied to the emission LED during the calibration phase when the emission LED was subjected the second temperature.

18. The illumination device as recited in claim 17, wherein for each emission LED, the control circuit is configured for determining the expected wavelength value by:

calculating a third plurality of wavelength values corresponding to the forward voltage presently measured across the emission LED by interpolating between the first plurality of stored wavelength values and the second plurality of *stored* wavelength values corresponding to the emission LED;

generating a relationship between the third plurality of wavelength values; and selecting the expected wavelength value from the generated relationship that corresponds to the drive current currently applied to the emission LED.

19. The illumination device as recited in claim 18, wherein the control circuit is configured for calculating the third plurality of wavelength values by using a linear interpolation technique to interpolate between the first and second plurality of stored wavelength values corresponding to the emission LED.

20. The illumination device as recited in claim 18, wherein the control circuit is configured for generating the relationship by applying a linear interpolation or a non-linear interpolation to the third plurality of wavelength values to respectively generate a linear relationship or a non-linear relationship between wavelength and drive current for the emission LED, wherein application of the linear interpolation or the non-linear interpolation is based on a color of the emission LED.

21. The illumination device as recited in claim 18, wherein the control circuit is configured for generating the relationship by applying a piece-wise linear interpolation to the third plurality of wavelength values to approximate a non-linear relationship between wavelength and drive current for the emission LED.

22. The illumination device as recited in claim [1] *17*, wherein for each emission LED, the table of stored calibration values further comprises:

a first plurality of stored intensity values, which were previously detected from the emission LED upon applying the plurality of different drive currents to the emission LED during the calibration phase when the emission LED was subjected to the first ambient temperature; and a second plurality of stored intensity values, which were previously detected from the emission LED upon applying the plurality of different drive currents to the emission LED during the calibration phase when the emission LED was subjected to the second [ambient] temperature.

23. The illumination device as recited in claim 22, wherein for each emission LED, the control circuit is configured for determining the expected intensity value by:

calculating a third plurality of intensity values corresponding to the forward voltage presently measured across the emission LED by interpolating between the first plurality of stored intensity values and the second plurality of *stored* intensity values corresponding to the emission LED;

generating a relationship between the third plurality of intensity values; and selecting the expected intensity value from the generated relationship that corresponds to the drive current currently applied to the emission LED.

24. The illumination device as recited in claim 23, wherein the control circuit is configured for calculating the third plurality of intensity values [comprises] *by* using a linear interpolation technique to interpolate between the first and second plurality of stored intensity values corresponding to the emission LED.

25. The illumination device as recited in claim 23, wherein the control circuit is configured for generating the relationship by applying a linear interpolation to the third plurality of intensity values to generate a linear relationship between intensity and drive current for the emission LED.

26. The illumination device as recited in claim 23, wherein the control circuit is configured for generating the relationship by applying a piece-wise linear interpolation to the third plurality of intensity values to approximate a non-linear relationship between intensity and drive current for the emission LED.

27. The illumination device as recited in claim 23, wherein the first, second and third plurality of intensity values comprise radiance values, and wherein the expected intensity value is an expected radiance value.

28. The illumination device as recited in claim 23, wherein the first, second and third plurality of intensity values comprise luminance values, and wherein the expected intensity value is an expected luminance value.

29. The illumination device as recited in claim 16, wherein the LED driver and receiver circuit is further configured for:

measuring a photocurrent induced on [the] *a* photodetector in response to the illumination produced by each emission LED, one emission LED at a time, and received by the photodetector during a second portion of the periodic intervals; and measuring a forward voltage presently developed across the photodetector by applying a non-operative drive current to the photodetector during a third portion of the periodic intervals.

30. The illumination device as recited in claim 29, wherein the control circuit is further configured for:

calculating, for each emission LED, a responsivity of the photodetector using the expected wavelength value determined for the emission LED, the forward voltage presently measured across the photodetector, and a plurality of coefficient values that were generated during a calibration phase and stored within the illumination device to characterize a change in the photodetector responsivity over emitter wavelength and photodetector forward voltage.

31. The illumination device as recited in claim 30, wherein for each emission LED, the control circuit is further configured for:

calculating an intensity value for the emission LED as a ratio of the induced photocurrent measured by the LED driver and receiver circuit over the photodetector responsivity calculated by the control circuit;

calculating a scale factor by dividing the expected intensity value determined for the emission LED by the intensity value calculated for the emission LED; and applying the scale factor to a desired luminous flux value for the emission LED to obtain an adjusted luminous flux value for the emission LED; and adjusting the drive current currently applied to the emission LED to achieve the adjusted luminous flux value.

*32. A method for controlling an illumination device comprising a plurality of emission light emitting diodes (LEDs) and a photodetector, wherein the method comprises:*

*applying respective drive currents to the plurality of emission LEDs to drive the plurality of emission LEDs substantially continuously to produce illumination;*

*turning the plurality of emission LEDs off for durations of time to produce periodic intervals;*

*based on measurements taken for each emission LED, one LED at a time, during a first portion of the periodic intervals, determining, for each emission LED, an expected wavelength value;*

*measuring a photocurrent induced on the photodetector in response to the illumination produced by each emission LED, one emission LED at a time, and received by the photodetector during a second portion of the periodic intervals;*

*measuring a forward voltage developed across the photodetector by applying a non-operative drive current to the photodetector during a third portion of the periodic intervals; and*

*calculating, for each emission LED, a responsivity of the photodetector using the expected wavelength value determined for the emission LED, the forward voltage measured across the photodetector, and a plurality of coefficient values that are stored within the illumination device to characterize a change in the photodetector responsivity over emitter wavelength and photodetector forward voltage.*

*33. The method as recited in claim 32, wherein for each emission LED, the method further comprises:*

*based on the responsivity of the photodetector calculated for the emission LED during the calculating step, adjusting the drive current currently applied to the emission LED.*

* * * * *